United States Patent
Kamijo et al.

(10) Patent No.: US 9,354,372 B2
(45) Date of Patent: May 31, 2016

(54) OPTICAL LAMINATE WITH POLARIZING FILM

(71) Applicant: NITTO DENKO CORPORATION, Ibaraki-shi, Osaka (JP)

(72) Inventors: Takashi Kamijo, Onomichi (JP); Akinori Izaki, Onomichi (JP); Takeharu Kitagawa, Onomichi (JP); Shusaku Goto, Onomichi (JP); Daigoro Nakagawa, Fukuyama (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/647,534

(22) PCT Filed: Feb. 6, 2014

(86) PCT No.: PCT/JP2014/052755
§ 371 (c)(1),
(2) Date: May 27, 2015

(87) PCT Pub. No.: WO2014/123184
PCT Pub. Date: Aug. 14, 2014

(65) Prior Publication Data
US 2015/0316696 A1    Nov. 5, 2015

(30) Foreign Application Priority Data

Feb. 7, 2013   (JP) ................................ 2013-022537
Jan. 31, 2014   (JP) ................................ 2014-017170

(51) Int. Cl.
*G02B 5/30*       (2006.01)
*G02B 1/14*       (2015.01)
(Continued)

(52) U.S. Cl.
CPC ............... *G02B 5/3033* (2013.01); *B32B 7/02* (2013.01); *B32B 7/12* (2013.01); *B32B 27/08* (2013.01);
(Continued)

(58) Field of Classification Search
None
See application file for complete search history.

(56) References Cited

U.S. PATENT DOCUMENTS

2011/0205628 A1   8/2011   Yasen et al.
2012/0038859 A1   2/2012   Miyatake et al.
(Continued)

FOREIGN PATENT DOCUMENTS

CN   102177449 A    9/2011
EP   2426523 A2     3/2012
(Continued)

OTHER PUBLICATIONS

Fresnel equations, Wikipedia, the free encyclopedia, Jul. 10, 2015, XPO55215927, https://en.wikipedia.org/w/index.php?title=Fresnel_equations&oldid=670764204.
(Continued)

*Primary Examiner* — Derek S Chapel
(74) *Attorney, Agent, or Firm* — Hauptman Ham, LLP

(57) ABSTRACT

An optical laminate in which a polarizing film including a polyvinyl alcohol-based resin having oriented iodine is bonded on a first surface of the polarizing film to an optical film through an optically transparent adhesive layer is provided. The polarizing film exhibits a property that a value expressed by the following formula: $Aa \times (Is/Ia)$, is 0.53 or more, where: $Aa$ represents an absorbance; $Ia$ represents a value obtained by integrating a distribution of integrated intensities in the thickness direction of the polarizing film; and $Is$ represents a value obtained by integrating a distribution of integrated intensities in the thickness direction of the polarizing film; and the adhesive layer exhibits a property that a difference between a refractive index of the adhesive layer and a refractive index in the absorption axis direction of the polarizing film at the first surface of the polarizing film is 0.08 or less.

18 Claims, 5 Drawing Sheets

(51) Int. Cl.
  *B32B 7/02* (2006.01)
  *B32B 7/12* (2006.01)
  *B32B 27/08* (2006.01)
  *B32B 27/30* (2006.01)
  *G02B 1/111* (2015.01)

(52) U.S. Cl.
  CPC ............... *B32B 27/306* (2013.01); *G02B 1/14* (2015.01); *G02B 5/3083* (2013.01); *B32B 2307/412* (2013.01); *B32B 2307/418* (2013.01); *B32B 2307/42* (2013.01); *B32B 2457/20* (2013.01); *B32B 2457/202* (2013.01); *B32B 2457/206* (2013.01); *G02B 1/111* (2013.01)

(56) References Cited

U.S. PATENT DOCUMENTS

| | | |
|---|---|---|
| 2012/0052197 A1 | 3/2012 | Sawada et al. |
| 2012/0055607 A1 | 3/2012 | Kitagawa et al. |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057107 A1 | 3/2012 | Kitagawa et al. |
| 2012/0057231 A1 | 3/2012 | Goto et al. |
| 2012/0057232 A1 | 3/2012 | Goto et al. |
| 2012/0058291 A1 | 3/2012 | Kitagawa et al. |
| 2012/0058321 A1 | 3/2012 | Goto et al. |
| 2012/0320459 A1 | 12/2012 | Akari et al. |
| 2013/0100529 A1 | 4/2013 | Kitagawa et al. |
| 2013/0114139 A1 | 5/2013 | Kitagawa et al. |
| 2014/0016198 A1 | 1/2014 | Sawada et al. |
| 2014/0044947 A1 | 2/2014 | Sawada et al. |

FOREIGN PATENT DOCUMENTS

| | | |
|---|---|---|
| JP | 2010-026498 A | 2/2010 |
| JP | 2010-271703 A | 12/2010 |
| JP | 2011-002816 A | 1/2011 |
| JP | 2012-073563 A | 4/2012 |
| JP | 2012-078511 A | 4/2012 |
| TW | 201100882 A | 1/2011 |
| TW | 201217149 A | 5/2012 |
| WO | 2010122911 A1 | 10/2010 |

OTHER PUBLICATIONS

European Search Report for application No. 14748720.1 dated Oct. 9, 2015.
International Search Report for application No. PCT/JP2014/052755 mailed Mar. 11, 2014.
Written Opinion for application No. PCT/JP2014/052755 mailed Mar. 11, 2014.
Decision to Grant a Patent for Japanese Application No. JP2014-017170 issued by JPO dated Aug. 26, 2014.
Decision to Grant with Search Result for application No. TW103104093 mailed on Feb. 9, 2015.
Chinese Office Action for application No. 201480002345.9 dated Aug. 12, 2015.

OPTICAL LAMINATE WITH POLARIZING FILM

CROSS REFERENCE TO RELATED APPLICATION

This application claims the priority of Japanese Patent Application Nos. 2013-022537, filed on Feb. 7, 2013 and 2014-017170, filed on Jan. 31, 2014 in the JPO (Japanese Patent Office). Further, this application is the National Phase application of International Application No. PCT/JP2014/052755 filed Feb. 6, 2014, which designates the United States and was published in Japanese.

TECHNICAL FIELD

The present invention relates to an optical laminate having a polarizing film. In particular, the present invention relates to an optical laminate in which a polarizing film comprised of a polyvinyl alcohol-based resin having oriented iodine is bonded on a first one of opposite surfaces of the polarizing film to an optical film through an optically transparent adhesive layer lying.

BACKGROUND ART

Currently, a polarizing film comprised of a polyvinyl alcohol (hereinafter referred to occasionally as "PVA")-based resin having oriented iodine is used in various optical displays for televisions, mobile phones, PDAs and others. Further, in recent years, a need for thickness reduction of the polarizing film has been becoming greater and greater (the following Patent Document 1).

LIST OF PRIOR ART DOCUMENTS

Patent Documents

Patent Document 1: JP 2012-073563A

SUMMARY OF THE INVENTION

Technical Problem

The inventors of the present invention found the following phenomenon. When a film thickness of a polarizing film comprised of a polyvinyl alcohol-based resin having oriented iodine becomes extremely thin, a reflectance in an absorption axis direction (absorption axis-directional reflectance) of the polarizing film significantly increases on a longer-wavelength side of a visible wavelength range, as compared to a conventional polarizing film having a relatively large thickness, and therefore an optical laminate in which the extremely thin polarizing film is bonded to an optical film through an adhesive layer lying on the side of a light entrance surface of the polarizing film encounters a problem that interference unevenness caused by reflected light from the polarizing film becomes visually recognizable. Further, as a result of diligent researches on the above phenomenon, the inventors found that an increase in absorption axis-directional reflectance of the polarizing film is associated with a density of polyiodine ions $I_3^-$ which exist adjacent to the light entrance surface of the polarizing film, are in complex with PVA, and are oriented in the absorption axis direction of the polarizing film (the density of polyiodine ions $I_3^-$ will hereinafter be referred to occasionally and simply as "iodine density").

Specifically, the inventors found that, in a situation where the absorption axis-directional reflectance of the polarizing film becomes larger along with an increase in iodine density in a region adjacent to the light entrance surface of the polarizing film, and, consequently, the absorption axis-directional reflectance of the polarizing film becomes greater than a predetermined value when the iodine density in the region adjacent to the light entrance surface of the polarizing film becomes greater than a predetermined value, the optical laminate with the above configuration encounters a previously unrecognized problem that interference unevenness caused by reflected light from the polarizing film becomes visually recognizable.

Therefore, there has not been found any prior art document which describes an example of a technique which relates to an optical laminate in which a polarizing film is bonded to an optical film through an adhesive layer lying on the side of a light entrance surface of the polarizing film, and addresses interference unevenness due to reflected light from the polarizing film.

In an optical laminate in which a polarizing film comprised of a polyvinyl alcohol-based resin having oriented iodine and configured to have a relatively high iodine density in a region adjacent to a light incidence surface of the polarizing film is bonded to an optical film through an adhesive layer lying on the side of the light incidence surface of the polarizing film, it is an object of the present invention to reduce interference unevenness due to reflected light from the polarizing film.

Solution to the Technical Problem

According to one aspect of the present invention, there is provided an optical laminate in which a polarizing film comprised of a polyvinyl alcohol-based resin having oriented iodine is bonded on a first surface of the polarizing film to an optical film through an optically transparent adhesive layer, wherein: the polarizing film exhibits a property that a value expressed by the following formula: Aa×(Is/Ia), is 0.53 or more, where: Aa represents an absorbance in an absorption axis direction of the polarizing film at a wavelength of 480 nm; Ia represents a value obtained by integrating, over an entire interval in a thickness direction of the polarizing film, a distribution of integrated intensities in the thickness direction of the polarizing film, wherein each of the integrated intensities is obtained by integrating a Raman spectrum of the polarizing film in a wavenumber interval of 90 $cm^{-1}$ to 120 $cm^{-1}$; and Is represents a value obtained by integrating, over the entire interval in the thickness direction of the polarizing film, a distribution of integrated intensities in the thickness direction of the polarizing film, wherein each of the integrated intensities is obtained by integrating, in a wavenumber interval of 90 $cm^{-1}$ to 120 $cm^{-1}$, Raman scattering of to $I_3^-$ ions which exist in a region of the polarizing film ranging from the first surface to 1 μm inward in the thickness direction thereof, and oriented in the absorption axis direction of the polarizing film; and the adhesive layer exhibits a property that a difference between a refractive index of the adhesive layer and a refractive index in the absorption axis direction of the polarizing film at the first surface of the polarizing film is 0.08 or less.

In a preferred embodiment, the difference between the refractive index in the absorption axis direction of the polarizing film at the first surface thereof and the refractive index of the adhesive layer is 0.06 or less.

In a preferred embodiment, the difference between the refractive index of the optical film and the refractive index of the adhesive layer is 0.10 or less.

According to another aspect of the present invention, there is provided an optical laminate comprising a polarizing film comprised of a polyvinyl alcohol-based resin having oriented iodine, and a sub-laminate, wherein: the sub-laminate comprises at least an optically transparent adhesive layer and an optical film, wherein the optical film is bonded to a first surface of the polarizing film through the optically transparent adhesive layer; the polarizing film exhibits a property that a value expressed by the following formula: Aa×(Is/Ia), is 0.53 or more, where: Aa represents an absorbance in an absorption axis direction of the polarizing film at a wavelength of 480 nm; Ia represents a value obtained by integrating, over an entire interval in a thickness direction of the polarizing film, a distribution of integrated intensities in the thickness direction of the polarizing film, wherein each of the integrated intensities is obtained by integrating a Raman spectrum of the polarizing film in a wavenumber interval of 90 $cm^{-1}$ to 120 $cm^{-1}$; and Is represents a value obtained by integrating, over the entire interval in the thickness direction of the polarizing film, a distribution of integrated intensities in the thickness direction of the polarizing film, wherein each of the integrated intensities is obtained by integrating, in a wavenumber interval of 90 cm-1 to 120 $cm^{-1}$, Raman scattering of $I_3^-$ ions which exist in a region of the polarizing film ranging from the first surface to 1 μm inward in the thickness direction thereof, and oriented in the absorption axis direction of the polarizing film; and the sub-laminate has a thickness of 60 μm or more.

In a preferred embodiment, the sub-laminate has a thickness of 80 μm or more.

According to further aspect of the present invention, there is provided an optical laminate, which comprises a polarizing film comprised of a polyvinyl alcohol-based resin having oriented iodine, and a sub-laminate, wherein: the sub-laminate comprises at least an optically transparent adhesive layer and an optical film, wherein the optical film is bonded to a first surface of the polarizing film through the optically transparent adhesive layer; the polarizing film exhibits a property that a value expressed by the following formula: Aa×(Is/Ia), is 0.53 or more, where: Aa represents an absorbance in an absorption axis direction of the polarizing film at a wavelength of 480 nm; Ia represents a value obtained by integrating, over an entire interval in a thickness direction of the polarizing film, a distribution of integrated intensities in the thickness direction of the polarizing film, wherein each of the integrated intensities is obtained by integrating a Raman spectrum of the polarizing film in a wavenumber interval of 90 $cm^{-1}$ to 120 $cm^{-1}$; and Is represents a value obtained by integrating, over the entire interval in the thickness direction of the polarizing film, a distribution of integrated intensities in the thickness direction of the polarizing film, wherein each of the integrated intensities is obtained by integrating, in a wavenumber interval of 90 $cm^{-1}$ to 120 $cm^{-1}$, Raman scattering of $I_3^-$ ions which exist in a region of the polarizing film ranging from the first surface to 1 μm inward in the thickness direction thereof, and oriented in the absorption axis direction of the polarizing film; and the sub-laminate has a Haze value of 0.5% or more.

In a preferred embodiment, the sub-laminate has a Haze value of 1.5% or more.

In a preferred embodiment, the sub-laminate has a Haze value of 10% or more.

In a preferred embodiment, the adhesive layer is formed using a solution containing a polyvinyl alcohol-based resin, a cross-linking agent and a colloidal metal compound.

In a preferred embodiment, the optical film is a protective layer made of a transparent resin material.

In a preferred embodiment, the optical laminate further comprises a protective layer made of a transparent resin material.

In a preferred embodiment, a hard coat layer is formed on the protective layer made of a transparent resin material.

In a preferred embodiment, the optical laminate comprises a retardation film.

In a preferred embodiment, the value of expressed by the formula Aa×(Is/Ia) is 0.55 or more.

In a preferred embodiment, the polarizing film has a thickness of 10 μm or less.

In a preferred embodiment, the polarizing film has a thickness of 7 μm or less.

In a preferred embodiment, the polarizing film has a thickness of 5 μm or less.

According to still further aspect of the present invention, there is provided a display which comprises the above optical laminate.

Effect of the Invention

In the optical laminate in which a polarizing film comprised of a polyvinyl alcohol-based resin having oriented iodine is bonded to an optical film through an optically transparent adhesive layer lying on the side of a first one of opposite surfaces of the polarizing film, wherein: the polarizing film exhibits a property that a value expressed by the following formula: Aa×(Is/Ia), is 0.53 or more, where: Aa represents an absorbance in an absorption axis direction of the polarizing film at a wavelength of 480 nm; Ia represents a value obtained by integrating, over an entire interval in a thickness direction of the polarizing film, a distribution of integrated intensities in the thickness direction of the polarizing film, wherein each of the integrated intensities is obtained by integrating a Raman spectrum of the polarizing film in a wavenumber interval of 90 $cm^{-1}$ to 120 $cm^{-1}$; and Is represents a value obtained by integrating, over the entire interval in the thickness direction of the polarizing film, a distribution of integrated intensities in the thickness direction of the polarizing film, wherein each of the integrated intensities is obtained by integrating, in a wavenumber interval of 90 $cm^{-1}$ to 120 $cm^{-1}$, a spectrum of Raman scattering due to $I_3^-$ ions which exist in a region of the polarizing film ranging from the first surface to 1 μm inward in the thickness direction thereof, and oriented in the absorption axis direction of the polarizing film; and the adhesive layer exhibits a property that a difference between a refractive index of the adhesive layer and a refractive index in the absorption axis direction of the polarizing film at the first surface of the polarizing film is 0.08 or less, the present invention can reduce interference unevenness due to reflected light from the polarizing film.

With reference to the drawings, embodiments of an optical laminate according to the present invention will now be described in detail.

DESCRIPTION OF EMBODIMENTS

Optical Laminate

Figure 1:
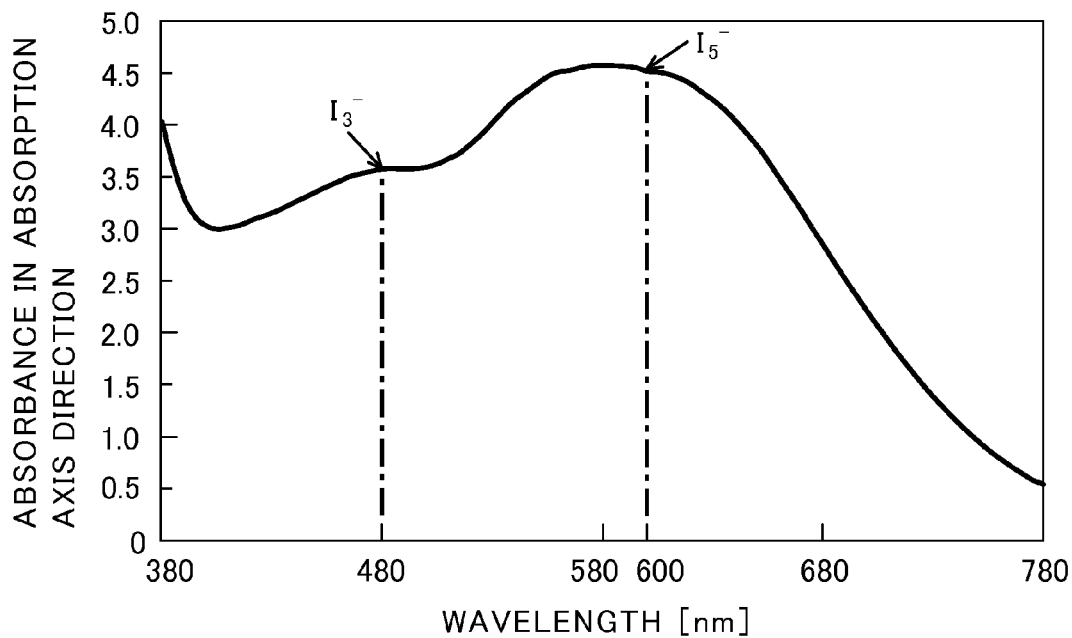
FIG. 1 is a graph presenting a relationship between an absorbance and a wavelength in a situation where polarized light parallel to an absorption axis of a polarizing film enters the polarizing film.

An optical laminate of the present invention is configured such that a polarizing film comprised of a polyvinyl alcohol-based resin having oriented iodine is bonded on one (first surface) of opposite surfaces of the polarizing film to an optical film through an optically transparent adhesive layer.

A polyvinyl alcohol-based resin which is stretched by a stretching process such as an in-air stretching (dry stretching) process or an in-boric-acid-solution stretching process and in which iodine is molecularly oriented may be used as the polarizing film to be used in the optical laminate of the present invention.

Examples of a polarizing film production method typically include a process (single-layer stretching process) comprising subjecting a single-layer body made of a PVA-based resin to a dyeing step and a stretching step, as described in JP 2004-341515A. Other examples thereof include a process comprising subjecting a PVA-based resin layer and a stretchable resin substrate to a stretching step and a dyeing step in the form of a laminate, as described in JP 51-069644A, JP 2000-338329A, JP 2001-343521A, WO 2010/100917A, JP 2012-073563A and JP 2011-002816A. In this process, the PVA-based resin layer is supported by the stretchable resin substrate, so that it becomes possible to stretch the PVA-based resin layer without any stretch-causing defect such as breaking, even when the PVA-based resin layer has a small thickness.

As the process configured to perform stretching and dyeing steps in the form of a laminate, there has been known an in-air stretching (dry stretching) process, as described in the JP 51-069644A, the JP 2000-338329A and the JP 2001-343521A. Further, in terms of being able to perform stretching at a high ratio and thus enhance polarization performance, it is preferable to employ a process comprising a step of performing stretching in a boric acid solution, as described in the WO 2010/100917A and the JP 2012-073563A, particularly, a process comprising a step of, before the in-boric-acid-solution stretching, performing auxiliary in-air stretching (two-stage stretching process), as described in the JP 2012-073563A. It is also preferable to employ a process comprising: stretching a PVA-based resin layer and a stretchable resin substrate together in the form of a laminate; dyeing excessively the stretched PVA-based resin layer; and decolorizing partly the excessively-dyed PVA-based resin layer (excessive dyeing and partial decolorization process), as described in the JP 2011-002816A. The polarizing film to be used in the optical laminate of the present invention may be a polarizing film which is comprised of a polyvinyl alcohol-based resin having oriented iodine, and stretched by a two-stage stretching process consisting of auxiliary in-air stretching and in-boric-acid-solution stretching, as mentioned above. Alternatively, the polarizing film to be used in the optical laminate of the present invention may be a polarizing film which is comprised of a polyvinyl alcohol-based resin having oriented iodine, and prepared by subjecting a laminate of a PVA-based resin layer and a stretchable resin substrate to excessive dyeing and then partial decolorization, as mentioned above.

The polarizing film to be used in the optical laminate of the present invention exhibits a property that a value expressed by the following formula: Aa×(Is/Ia), is 0.53 or more, where:

Aa represents an absorbance in an absorption axis direction of the polarizing film at a wavelength of 480 nm;

Ia represents a value obtained by integrating, over an entire interval in a thickness direction of the polarizing film, a distribution of integrated intensities in the thickness direction of the polarizing film, wherein each of the integrated intensities is obtained by integrating a Raman spectrum of the polarizing film in a wavenumber interval of 90 cm$^{-1}$ to 120 cm$^{-1}$; and Is represents a value obtained by integrating, over the entire interval in the thickness direction of the polarizing film, a distribution of integrated intensities in the thickness direction of the polarizing film, wherein each of the integrated intensities is obtained by integrating, in a wavenumber interval of 90 cm$^{-1}$ to 120 cm$^{-1}$, Raman scattering of $I_3^-$ ions which exist in a region of the polarizing film ranging from the first surface to 1 μm inward in the thickness direction thereof, and oriented in the absorption axis direction of the polarizing film. The value of the formula Aa×(Is/Ia) may be 0.55 or more.

First of all, a meaning of the absorbance Aa in the absorption axis direction (absorption axis-directional absorbance Aa) of the polarizing film at a wavelength of 480 nm will be described.

FIG. 1 is a graph presenting a relationship between an absorbance and a wavelength in a situation where polarized light parallel to the absorption axis of the polarizing film enters the polarizing film.

It is believed that, in a polarizing film comprised of a PVA-based resin having iodine adsorbed therein, the adsorbed iodine forms polyiodine ions such as $I_3^-$ and $I_5^-$, each in complex with PVA. It is known that, in FIG. 1, an absorption around 480 nm corresponds to $I_3^-$ in complex with PVA, and an absorption around 600 nm corresponds to $I_5^-$ in complex with PVA.

In accordance with the Lambert-Beer law, an absorbance A of a certain medium can be generally expressed as the following formula: A=ε c L, where: ε represents a molar absorbance coefficient of the medium; c represents a molar concentration of the medium; and L represents a cell (light path) length. Therefore, c L=A/ε, which means that the absorbance serves as an index indicative of an amount of the medium per unit area (surface density of the medium) with respect to the entire thickness of the polarizing film.

Thus, although it is difficult to determine a molar absorbance coefficient of each of $I_3^-$ and $I_5^-$ in complex with PVA, an amount of $I_3^-$ ions which are in complex with PVA and are oriented in the absorption axis direction of the polarizing film, in terms of per unit area with respect to the entire thickness of the polarizing film, can be indicated by using, as an index, the absorption axis-directional absorbance Aa of the polarizing film at 480 nm.

Next, Ia, i.e., a value obtained by integrating, over an entire interval in a thickness direction of a polarizing film, a distribution of integrated intensities in the thickness direction of the polarizing film, wherein each of the integrated intensities is obtained by integrating a Raman spectrum of the polarizing film in a wavenumber interval of 90 cm$^{-1}$ to 120 cm$^{-1}$, and Is, i.e., a value obtained by integrating, over the entire interval in the thickness direction of the polarizing film, a distribution of integrated intensities in the thickness direction of the polarizing film, wherein each of the integrated intensities is obtained by integrating, in a wavenumber interval of 90 cm$^{-1}$ to 120 cm$^{-1}$, Raman scattering of $I_3^-$ ions which exist in a region of the polarizing film ranging from the first surface to 1 μm inward in the thickness direction thereof, and oriented in the absorption axis direction of the polarizing film, will be described.

The absorption axis-directional absorbance Aa of the polarizing film at 480 nm is an index indicative of an amount of $I_3^-$ ions which are in complex with PVA and are oriented in the absorption axis direction of the polarizing film, in terms of per unit area with respect to the entire thickness of the polarizing film. Thus, an index indicative of an amount of $I_3^-$ ions which exist in a region adjacent to a surface of the polarizing film, are in complex with PVA, and are oriented in the absorption axis direction of the polarizing film, can be determined by knowing a ratio thereof to an amount of $I_3^-$ ions which exist in the entire thickness, are in complex with PVA, and are oriented in the absorption axis direction of the polarizing film. In the present invention, an amount of $I_3^-$ ions which exist in a region adjacent to the surface of the polarizing film, are in complex with PVA, and are oriented in the absorption axis direction of the polarizing film, is deemed as an amount of $I_3^-$ ions which exist in a region of the polarizing film ranging from the surface thereof to 1 μm inward in the thickness direction thereof, are in complex with PVA, and are oriented in the absorption axis direction of the polarizing film.

Figure 2:
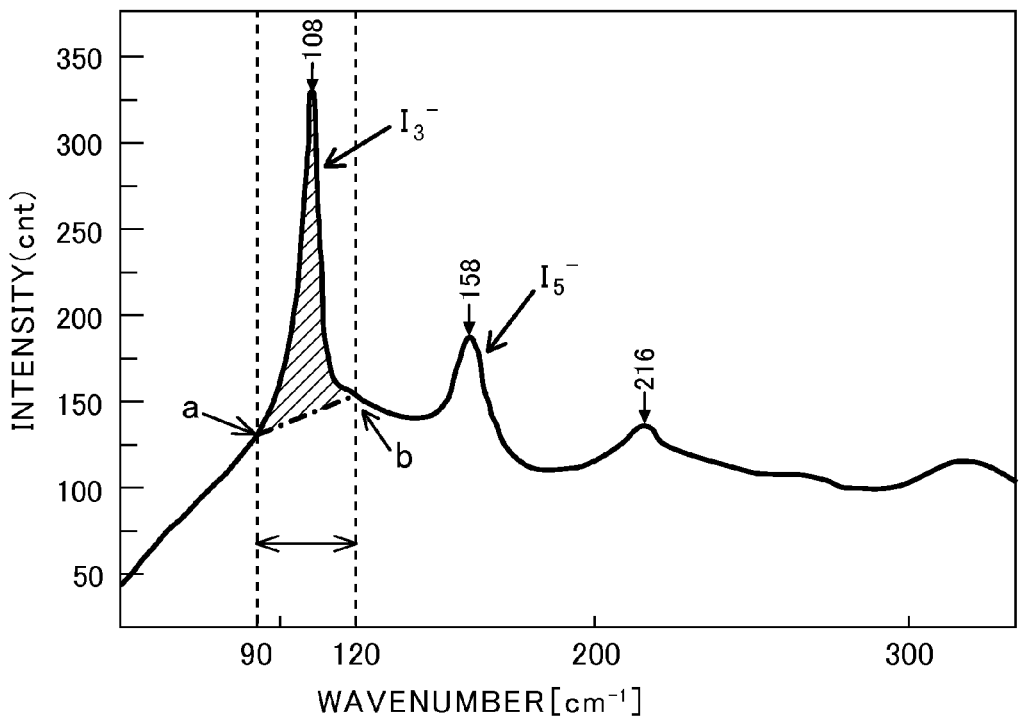
FIG. 2 is a graph presenting one example of a Raman spectrum of a polarizing film.

A Raman spectrometric method is known as means to evaluate an amount of $I_3^-$ or $I_5^-$ ions in a polarizing film. This is a technique of detecting Raman scattering light caused by vibrations of molecular skeleton arising from incidence of single wavelength laser light in the range of an ultraviolet to near-infrared. FIG. 2 illustrates an example of a Raman spectrum of a polarizing film, obtained by a Raman spectrometric method using laser light having a wavelength of 514.5 nm and a polarization plane parallel to an absorption axis direction of the polarizing film. It is known that, in this Raman spectrum, a peak around 108 cm$^{-1}$ and a peak around 158 cm$^{-1}$ are caused, respectively, by $I_3^-$ and $I_5^-$ each oriented in the absorption axis of the polarizing film. Therefore, an integrated intensity obtained by integrating a Raman spectrum in a predetermined wavenumber interval in the neighborhood of a peak around a wavenumber of 108 cm$^{-1}$ can be used as an index indicative of an amount of $I_3^-$ oriented in the absorption axis of the polarizing film, at one measurement point.

In the present invention, the predetermined wavenumber interval is a wavenumber interval of 90 cm$^{-1}$ to 120 cm$^{-1}$. Then, with regard to Raman intensity, baseline correction is performed. Referring to FIG. 2, the baseline correction is an operation of correcting an inclination of a baseline in the measurement by performing a straight-line approximation of a baseline of a Raman spectrum in the interval of wavenumber of 90 cm$^{-1}$ to 120 cm$^{-1}$ with a straight line connecting two points a, b which indicate, respectively, a Raman intensity at a wavenumber of 90 cm$^{-1}$ and a Raman intensity at a wavenumber of 120 cm$^{-1}$ and determining a distance from the approximated straight-line, as a Raman intensity.

Figure 3A:
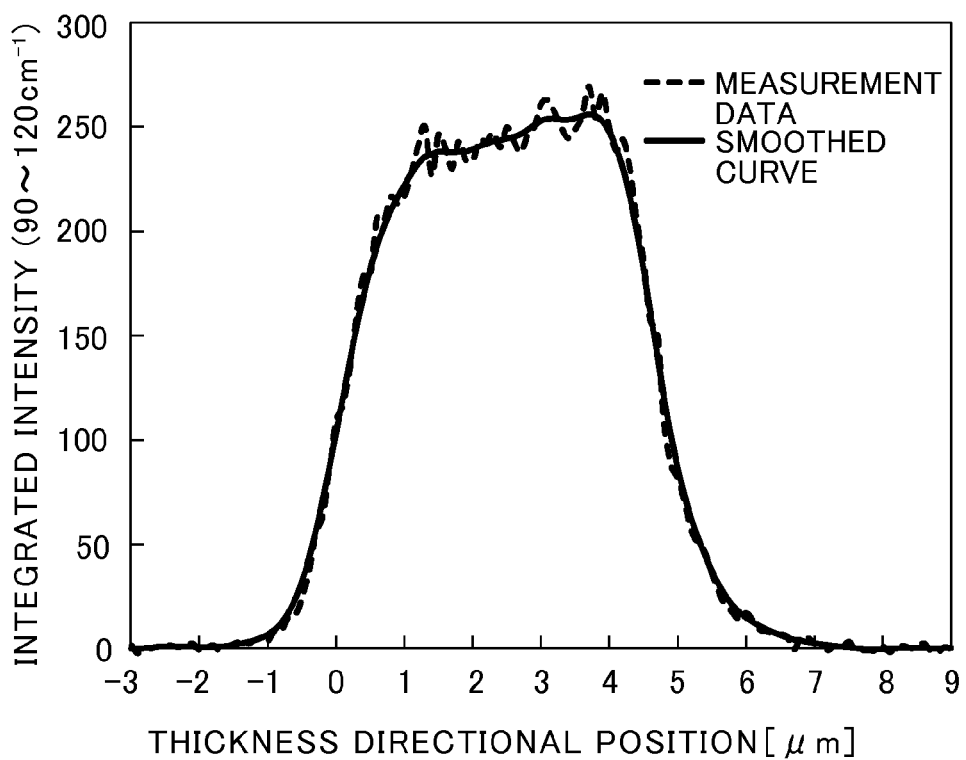
FIG. 3(a) is a graph presenting an example of a distribution of integrated intensities in a wavenumber interval of 90 $cm^{-1}$ to 120 $cm^{-1}$, at each measurement point of a polarizing film according to Raman spectrometry.
Figure 3B:
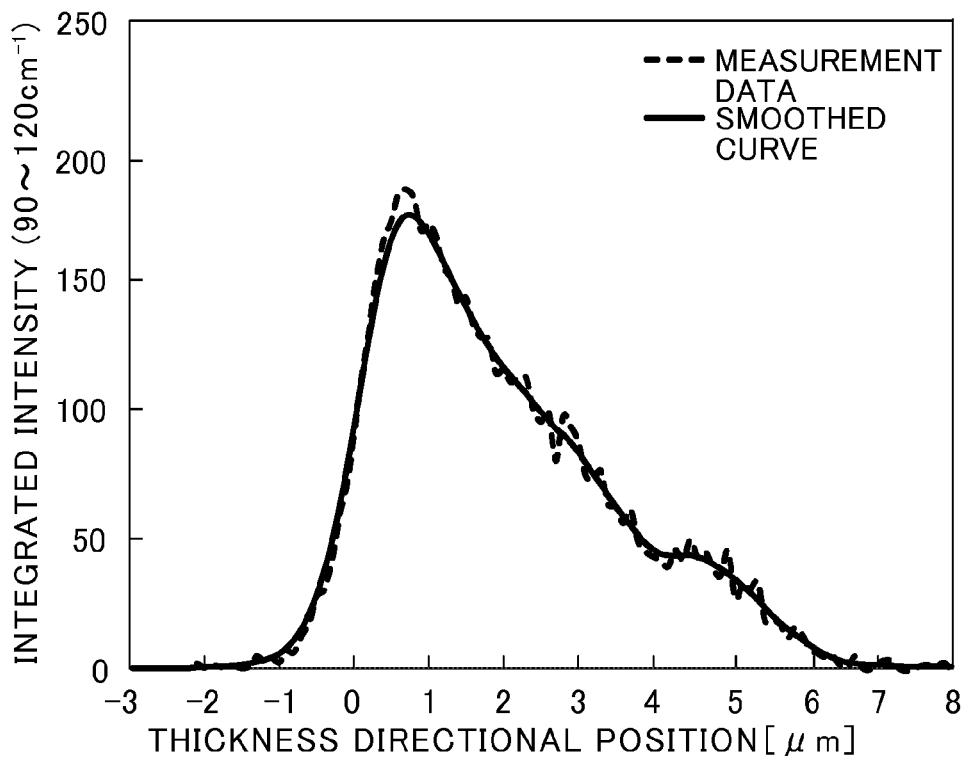
FIG. 3(b) is a graph presenting an example of a distribution of integrated intensities in a wavenumber interval of 90 cm$^{-1}$ to 120 cm$^{-1}$, at each measurement point of a polarizing film according to Raman spectroscopy.

In order to calculate a ratio of an amount of $I_3^-$ ions which exist in a region of a polarizing film ranging from a surface of the polarizing film to 1 μm inward in a thickness direction of the polarizing film, and are oriented in an absorption axis direction of the polarizing film, first of all, Raman spectra are measured for the cross-section of the polarizing film while shifting a measurement point in the thickness direction to determine a distribution of integrated intensities in a wavenumber interval of 90 cm$^{-1}$ to 120 cm$^{-1}$ at respective measurement points. Examples of the resulting integrated intensity distribution are illustrated in FIGS. 3(a) and 3(b). FIG. 3(a) and FIG. 3(b) present integrated intensity distributions for a polarizing film in aftermentioned Inventive Example 1-3 (Comparative Example 1-3) and a polarizing film in Inventive Example 1-17 (Comparative Example 1-12), respectively. In the figures, the origin point in the thickness direction corresponds to a position of an aftermentioned inflection point, wherein suppose that light enters from the side of negative coordinates.

In the integrated intensity distribution graph in the thickness direction of the polarizing film illustrated in FIG. 3, Ia, i.e., a value obtained by integrating the integrated intensity distribution over the entire interval in the thickness direction of the polarizing film, corresponds to a Raman scattering of $I_3^-$ ions which exist in the entire region of the polarizing film in the thickness direction thereof and are oriented in the absorption axis direction of the polarizing film, so that it is considered that Ia represents an amount of $I_3^-$ ions which exist in the entire region of the polarizing film in the thickness direction thereof and are oriented in the absorption axis direction of the polarizing film.

In the present invention, Ia is calculated as an integrated value of the integrated intensities each subjected to a smoothing processing based on weighted moving average. An integrated intensity $I_{WMA}(x)$ after being subjected to the smoothing processing is determined by using the following formula:
$I_{WMA}=[I(x-0.5)\times1+I(x-0.4)\times2+I(x-0.3)\times4+I(x-0.2)\times6+I(x-0.1)\times8+I(x)\times10+I(x+0.1)\times8+I(x+0.2)\times6+I(x+0.3)\times4+I(x+0.4)\times2+I(x+0.5)\times1]/(1+2+4+6+8+10+8+6+4+2+1)$,
wherein $I(x)$ is an integrated intensity measured at a thickness directional position x before being subjected to the smoothing processing.

Examples of obtained distributions of integrated intensities after the smoothing processings are illustrated in FIGS. 3(a) and 3(b).

An amount of $I_3^-$ ions which exist in the region of the polarizing film ranging from the surface thereof to 1 μm inward in the thickness direction thereof and are oriented in the absorption axis direction of the polarizing film, corresponds to a spectrum of Raman scattering due to $I_3^-$ ions which exist in the region of the polarizing film ranging from the surface thereof to 1 μm inward in the thickness direction thereof and are oriented in the absorption axis direction of the polarizing film. Thus, Is, i.e., a value obtained by integrating in the thickness direction of the polarizing film, a distribution of integrated intensities in the thickness direction of the polarizing film, wherein each of the integrated intensities is obtained by integrating, in a wavenumber interval of 90 cm$^{-1}$ to 120 cm$^{-1}$, Raman scattering due of $I_3^-$ ions which exist in the region of the polarizing film ranging from the first surface to 1 μm inward in the thickness direction thereof and are oriented in the absorption axis direction of the polarizing film, is deemed to be indicative of an amount of $I_3^-$ ions which exist in the region of the polarizing film ranging from the surface thereof to 1 μm inward in the thickness direction thereof and are oriented in the absorption axis direction of the polarizing film.

Thus, it is considered that a ratio of an amount of $I_3^-$ ions which exist in the region of the polarizing film ranging from the surface thereof to 1 μm inward in the thickness direction thereof, are in complex with PVA, and are oriented in the absorption axis direction of the polarizing film, to an amount of $I_3^-$ ions which exist in the entire region of the polarizing film in the thickness direction thereof, are in complex with PVA, and are oriented in the absorption axis direction of the polarizing film, can be approximated by a ratio of an amount of $I_3^-$ ions which exist in the region of the polarizing film ranging from the surface thereof to 1 μm inward in the thickness direction thereof and are oriented in the absorption axis direction of the polarizing film, to an amount of $I_3^-$ ions which exist in the entire region of the polarizing film in the thickness direction thereof and are oriented in the absorption axis direction of the polarizing film. Therefore, Aa×(Is/Ia) serves as an index indicative of an amount of $I_3^-$ ions which exist in the region of the polarizing film ranging from the surface thereof to 1 μm inward in the thickness direction thereof, are in complex with PVA, and are oriented in the absorption axis direction of the polarizing film.

In this regard, although an amount of $I_3^-$ ions which exist in the region of the polarizing film ranging from the surface thereof to 1 μm inward in the thickness direction thereof and are oriented in the absorption axis direction of the polarizing film corresponds to Is, i.e., a value obtained by integrating, over the entire interval in the thickness direction of the polarizing film, a distribution curve (partial distribution curve) of integrated intensities corresponding to Raman scattering of $I_3^-$ ions which exist in the region of the polarizing film ranging from the surface up thereof to 1 μm inward in the thickness direction thereof and are oriented in the absorption axis direction of the polarizing film, it is unable to accurately determine this value. Then, in the present invention, Is, i.e., a value obtained by integrating, over the entire interval in the thickness direction of the polarizing film, a distribution of integrated intensities in the thickness direction of the polarizing film, wherein each of the integrated intensities is obtained by integrating, in a wavenumber interval of 90 cm$^{-1}$ to 120 cm$^{-1}$, Raman scattering of $I_3^-$ ions which exist in a region of the polarizing film ranging from the surface thereof to 1 μm inward in the thickness direction thereof and are oriented in the absorption axis direction of the polarizing film, is approximately determined.

Figure 4:
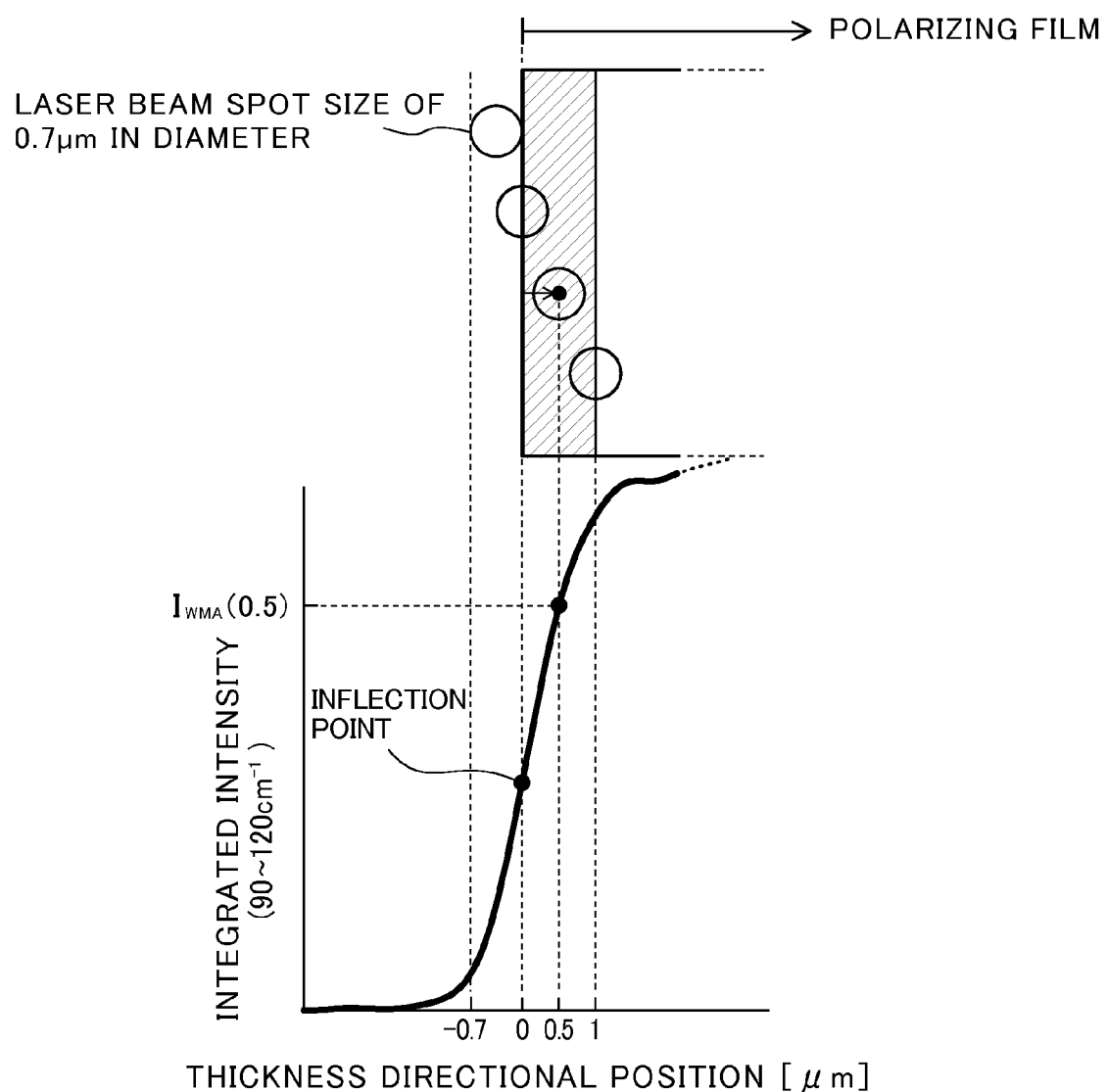
FIG. 4 is a diagram presenting a relationship between a distribution of integrated intensities obtained from an $I_3^-$ spectrum after a smoothing processing, and a position of a laser light spot, in approximation for Is.

Referring to FIG. 4, in a distribution of the integrated intensities obtained through the smoothing processing in the above manner during calculation of Ia, an inflection point in a rise region of a light entrance side is determined. Assume that a cross-section spot of a laser beam for use in Raman Analysis is a circle. In this case, it is considered that, when a center of the cross-sectional spot is located at a position of the surface of the polarizing film, rate of change in area of a cut surface of the polarizing film irradiated with the laser beam is maximized, and rate of change in integrated intensity of Raman scattering of $I_3^-$ is maximized. Thus, it can be presumed that a position of the inflection point approximately corresponds to a position of the surface of the polarizing film.

Then, when the cross-section of the spot of the laser beam is located at a center of the region of the polarizing film ranging from the surface thereof to 1 μm inward in the thickness direction thereof, i.e., located at a position away from the surface thereof by 0.5 μm, a ratio of Raman scattering from air and $I_3^-$ ions which exist in the remaining region of the polarizing film other than the region ranging from the surface of the polarizing film to 1 μm inward in the thickness direction of the polarizing film, to a measurement value, becomes the smallest compared to when the cross-section of the spot of the laser is located at the other position. Thus, it is considered that an integrated intensity when the cross-section spot of the laser beam is located at a position away from the surface of the polarizing film by +0.5 μm optimally represents an integrated intensity value corresponding to Raman scattering of $I_3^-$ ions which exist in the region of the polarizing film ranging from the surface thereof to 1 μm inward in the thickness direction thereof. Then, in the present invention, Is is determined, on an assumption that, in an interval ranging from the surface of the polarizing film to 1 μm inward, a distribution of integrated intensities in the thickness direction of the polarizing film, wherein each of the integrated intensities is obtained by integrating, in a wavenumber interval of 90 cm$^{-1}$ to 120 cm$^{-1}$, Raman scattering of $I_3^-$ ions which exist in the region of the polarizing film ranging from the surface thereof to 1 μm inward in the thickness direction thereof and are oriented in the absorption axis direction of the polarizing film, is approximately kept constant at a value of the integrated intensity $I_{WMA}(0.5)$ at the position away from the surface of the polarizing film by +0.5 μm after the smoothing processing, whereas, in the remaining interval, the distribution is approximately zero. That is, Is is approximated by the following formula: $Is = I_{WMA}(0.5) \times 1 = I_{WMA}(0.5)$.

Examples of the optical film may include a protective layer made of a transparent resin material, and a retardation film. As the transparent resin protective layer, it is common to use a thermoplastic resin excellent in transparency, mechanical strength, thermal stability, water blocking capability, isotropy and others. Specific examples of such thermoplastic resin include cellulose resin such as triacetylcellulose, polyester resin, polyethersulfone resin, polysulfone resin, polycarbonate resin, polyamide resin, polyimide resin, polyolefin resin, (meth)acrylic resin, cyclic polyolefin resin (norbornene-based resin), polyarylate resin, polystyrene resin, polyvinyl alcohol resin, and mixtures thereof.

Examples of the retardation film include a ¼ wavelength retardation film disposed on a viewing side with respect to a polarizing film (see paragraph [0213] of JP 2012-133303A), an anti-reflection retardation film disposed on the side of a panel (see paragraphs [0221], [0222] and [0228] of JP 2012-133303A), a viewing-angle compensating retardation film disposed on the side of a panel (see paragraphs [0225] and [0226] of JP 2012-133303A), and viewing-angle compensating obliquely-oriented retardation film disposed on the side of a panel (see paragraph [0227] of JP 2012-133303A).

The ¼ wavelength retardation film disposed on a viewing side with respect to a polarizing film is operable to convert linearly-polarized light emitted from the polarizing film into circularly-polarized light. This configuration provides an advantage of being able to eliminate any problem with visual recognition even when a viewer wears polarized sunglasses. The ¼ wavelength retardation film disposed on the side of a panel is used to prevent light entering from a viewing side of a polarizing film into the polarizing film from being internally reflected and emitted to the viewing side. The viewing-angle compensating retardation film disposed on the side of a panel is effective in correction of a crossing angle of between polarizing films for oblique view, and compensation for a phase difference in a thickness direction due to liquid crystal. The obliquely-oriented retardation film fulfills a function of viewing angle compensation in an ON state of a TN liquid crystal. The obliquely-oriented retardation film is described in Hiroyuki MORI, et al., "Development of Wide View SA, a Film Product Widening the Viewing Angle of LCDs", FUJI-FILM RESEARCH & DEVELOPMENT (No. 46-2001), pp 51-55.

As the retardation film herein, it is possible to use any heretofore-known retardation film, as long as it substantially having at least one of the above functions, without restrictions, for example, on retardation value, arrangement angle, three-dimensional birefringence, and as to whether it is a single-layer type or multi-layer type.

The transparent resin protective layer may be bonded to one surface of the polarizing film through an optically transparent adhesive, or may be laminated together with one or more optical films interposed between the transparent resin protective layer and the polarizing film.

In the optical laminate of the present invention, a hard coat layer may be additionally formed on the transparent resin protective layer. The hard coat layer may be made, for example, of acrylic-based resin, urethane-based resin, melamine-based resin, organosilicate compound, silicone-based resin or metal oxide. In particular, in view of hardness, durability and the like, a silicone-based resin and an acrylic-based resin are preferable. Further, in view of curability, flexibility and productivity, a type made of an acrylic-based resin, particularly an active ray-curable acrylic-based resin or heat-curable (thermosetting) acrylic-based resin, is preferable.

As mentioned above, the inventors of the present invention found the phenomenon that, when a film thickness of a polarizing film comprised of a polyvinyl alcohol-based resin having oriented iodine becomes extremely thin, a reflectance in an absorption axis direction of the polarizing film significantly increases in a longer-wavelength side of a visible wavelength range, as compared to a conventional polarizing film having a relatively large thickness, and therefore, due to reflected light from the polarizing film, interference unevenness occurs in an optical laminate having such an extremely thin polarizing film. Further, as a result of diligent researches on the above phenomenon, the inventors found that an increase in reflectance in the absorption axis direction of the polarizing film is associated with an iodine density in a region adjacent to a light entrance surface of the polarizing film.

Figure 5:
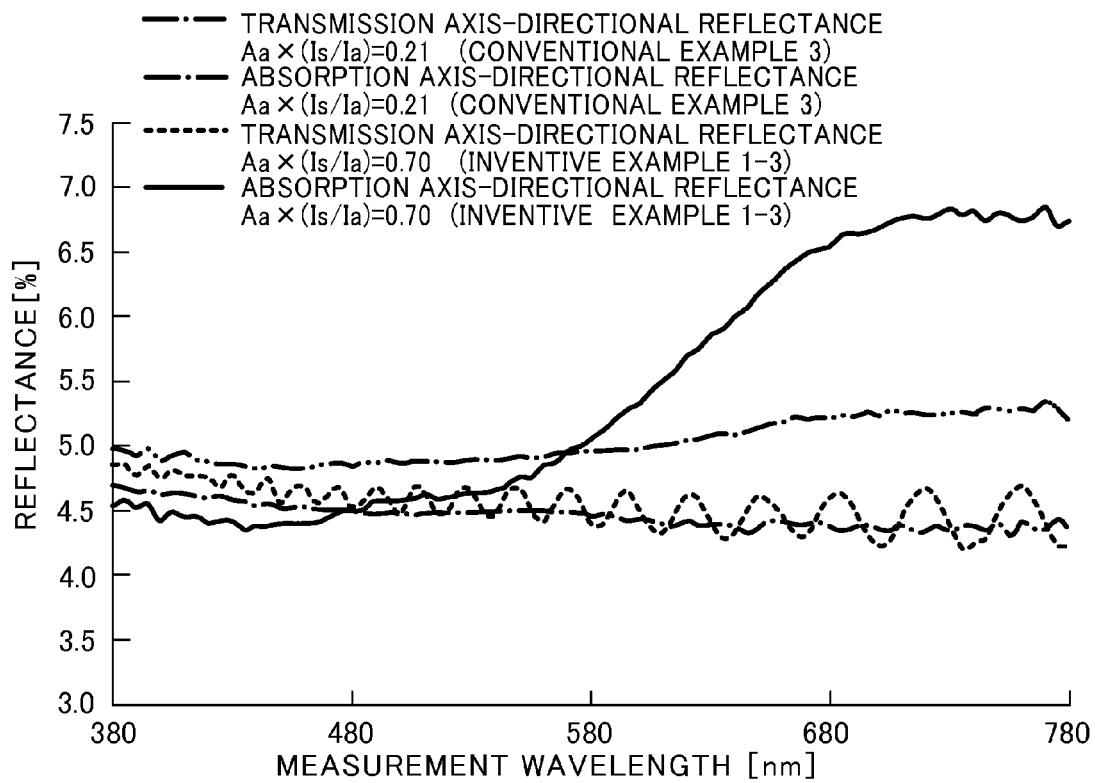
FIG. 5 is a graph presenting reflection spectra in transmission and absorption axes of a polarizing film having a relatively low iodine density in a region adjacent to a surface thereof, and a polarizing film having a relatively high iodine density in a region adjacent to a surface thereof.

FIG. 5 illustrates a comparison between a polarizing film having a relatively low iodine density in a region adjacent to a light entrance surface thereof, and a polarizing film having a relatively high iodine density in a region adjacent to a surface thereof, in terms of reflection spectra in transmission and absorption axes of each of the polarizing films. The polarizing film having a relatively low iodine density and the polarizing film having a relatively high iodine density, each exemplified in FIG. 5, correspond, respectively, to aftermentioned Conventional Example 3 and Inventive Example 1-3 (Comparative Example 1-3). As can be seen from FIG. 5, a reflectance in the transmission axis direction (transmission axis-directional reflectance) is kept at about 4.5%, and almost no variation is observed in both of the polarizing film with a relatively low iodine density and the polarizing film with a relatively high iodine density, whereas an absorption axis-directional reflectance in the polarizing film with a relatively high iodine density significantly increases in a longer-wavelength side of a visible wavelength range, as compared to the polarizing film with a relatively low iodine density.

Thus, interference unevenness, which has not been visually recognized in a conventional optical laminate using a polarizing film with a relatively low iodine density, becomes visually recognizable in an optical laminate using a polarizing film with a relatively high iodine density. This phenomenon will be discussed based on an optical laminate according to one embodiment of the present invention.

Figure 6:
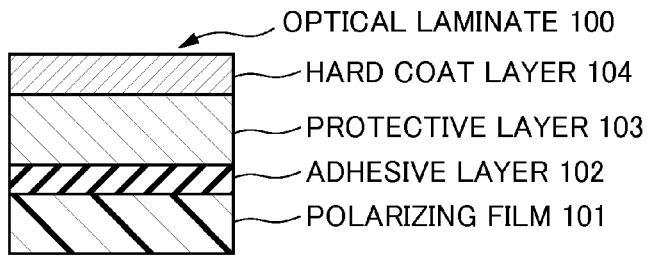
FIG. 6 is a sectional view illustrating an optical laminate according to one embodiment of the present invention.

FIG. 6 is a sectional view illustrating an optical laminate according to one embodiment of the present invention. The optical laminate 100 comprises a polarizing film 101, wherein the polarizing film 101 is bonded on one of opposite surfaces of the polarizing film 101 to a protective layer 103 made of a transparent resin material through an optically transparent adhesive layer 102, and a hard coat layer 104 is additionally formed on a surface of the protective layer 103 on a side opposite to the adhesive layer 102.

Light rays enter from outside the hard coat layer 104, wherein a part thereof are reflected by a surface of the hard coat layer 104, and the rest are transmitted through the hard coat layer 104. Then, a part of the rays transmitted through the hard coat layer 104 are reflected by an interface between the hard coat layer 104 and the protective layer 103 due to a difference in refractive index between the hard coat layer 104 and the protective layer 103, and the rest are transmitted through the protective layer 103. Then, a part of the rays transmitted through the protective layer 103 are reflected by an interface between the protective layer 103 and the adhesive layer 102 due to a difference in refractive index between the protective layer 103 and the adhesive layer 102, and the rest are transmitted through and the adhesive layer 102. Then, a part of the rays transmitted through the adhesive layer 102 are reflected by an interface between the adhesive layer 102 and the polarizing film 101 due to a difference in refractive index between the adhesive layer 102 and the polarizing film 101, and the rest are transmitted through and the polarizing film 101.

If such reflected light beams strongly interfere with each other, interference unevenness will be visually recognized. Thus, in a conventional optical laminate using a polarizing film with a relatively low iodine density, such strong interference does not occurs between light beams reflected by the polarizing film and thereby no interference unevenness is visually recognized, whereas, in an optical laminate using a polarizing film with a relatively high iodine density, a reflectance of the polarizing film significantly increases, so that strong interference occurs by light beams reflected by the polarizing film and thereby interference unevenness becomes visually recognizable.

This phenomenon becomes prominent in a situation where an anti-reflection layer is additionally formed on the hard coat layer. That is, the anti-reflection layer formed on the hard coat layer is optimized so as to minimize reflection without taking into account the phenomenon that strong reflection occurs at a polarizing film having a high iodine density in a region adjacent to a light entrance surface thereof, which was found by the inventors. Thus, in a situation where strong reflection occurs at a polarizing film as a result of an increase in iodine density in a region adjacent to a light entrance surface thereof, the anti-reflection layer may not suppress such reflection, and thereby interference unevenness becomes prominent.

Therefore, an optical laminate according to a first aspect of the present invention is configured to reduce a difference between an absorption axis-directional refractive index of a polarizing film at a light entrance-side one (first surface) of opposite surfaces of the polarizing film (in a region adjacent to the light entrance surface of the polarizing film) and a refractive index of an adhesive layer, and thereby suppress light reflection at an interface between the adhesive layer and the polarizing film due to a difference between the refractive index of the adhesive layer and the absorption axis-directional refractive index of the polarizing film at the light entrance surface of the polarizing film (in a region adjacent to the light entrance surface of the polarizing film). This reduces an intensity of the light reflection at the interface between the adhesive layer and the polarizing film which would otherwise be increased due to a significant increase in a reflectance caused by the polarizing film itself, thereby suppressing interference unevenness.

Here, a refractive index na in an absorption axis direction (absorption axis-directional refractive index na) of a polarizing film for use in the optical laminate of the present invention, at a first surface of the polarizing film, means a converted refractive index which is derived from an actually measured value of a reflectance Ra in the absorption axis direction (absorption axis-directional reflectance Ra) of the polarizing film at the first surface of the polarizing film, assuming that a refractive index of air is 1, and using the following formula: $Ra=((1-na)/(1+na))^2$. Therefore, value of na is deemed to be a value close to a refractive index in a region of the polarizing film adjacent to the first surface thereof, i.e., in a region of the polarizing film ranging from the first surface to 1 μm inward in a thickness direction thereof.

In the optical laminate using the polarizing film comprised of a polyvinyl alcohol-based resin having oriented iodine, according to the first aspect of the present invention, interference unevenness can be suppressed when a difference between an absorption axis-directional refractive index of the polarizing film at a first surface of the polarizing film, and a refractive index of an adhesive layer, is 0.08 or less. Preferably, the difference between the absorption axis-directional refractive index of the polarizing film at the first surface thereof and the refractive index of the adhesive layer is 0.07 or less, in view of a capability of more effectively suppressing interference unevenness. More preferably, the difference between the absorption axis-directional refractive index of the polarizing film at the first surface thereof and the refractive index of the adhesive layer is 0.06 or less, in view of a capability of much more effectively suppressing interference unevenness. Particularly preferably, the difference between the absorption axis-directional refractive index of the polarizing film at the first surface thereof and the refractive index of the adhesive layer is 0.03 or less, in view of a capability of particularly effectively suppressing interference unevenness.

Considering only a relationship between the polarizing film and the adhesive layer, if the difference between the absorption axis-directional refractive index of the polarizing film at the first surface thereof and the refractive index of the adhesive layer is reduced to zero, it becomes possible to eliminate light reflection at an interface between the adhesive layer and the polarizing film due to the difference between the refractive index of the adhesive layer and the absorption axis-directional refractive index of the polarizing film at the first surface thereof, and maximally suppress interference unevenness.

However, for reducing, to zero, the difference between the absorption axis-directional refractive index of the polarizing film at the first surface thereof and the refractive index of the adhesive layer, it is necessary to increase the refractive index of the adhesive layer and it is not always easy to prepare such an adhesive layer. Moreover, when the refractive index of the adhesive layer is increased, a difference between the refractive index of the adhesive layer and a refractive index, for example, of a protective layer is conversely increased, so that an intensity of light reflection at an interface between the protective layer and the adhesive layer is increased, and thereby interference unevenness becomes visually recognizable.

Thus, with a view to avoiding a situation where refractive index differences between adjacent ones of layers constituting the optical laminate become uneven, it is preferable to allow a certain level, i.e., 0.07 or less of refractive index difference to be provided between the absorption axis-directional refractive index of the polarizing film at the first surface thereof and the refractive index of the adhesive layer. In this respect, it is more preferable that the difference between the refractive index of the adhesive layer and a refractive index of the optical film such as the protective layer is 0.10 or less.

An adhesive of the adhesive layer, a resin solution containing a polyvinyl alcohol-based resin, a cross-linking agent and a colloidal metal compound may be used.

The colloidal metal compound may be blended in an amount of 200 weight parts or less with respect to 100 weight parts of the polyvinyl alcohol-based resin.

Preferably, the colloidal metal compound is selected from the group consisting of colloidal alumina, colloidal silica, colloidal zirconia, colloidal titania, colloidal tin oxide and mixtures thereof.

As the polyvinyl alcohol-based resin for use in the adhesive, it is particularly preferable to use a polyvinyl alcohol-based resin containing an acetoacetyl group. The adhesive using the acetoacetyl group-containing polyvinyl alcohol-based resin can form an adhesive layer excellent in water-resistant property.

As the cross-linking agent for use in the adhesive, it is preferable to use a type containing a compound having a methylol group. Preferably, the cross-linking agent is contained in an amount of 4 to 60 weight parts with respect to 100 weight parts of the polyvinyl alcohol-based resin.

Preferably, a thickness of the adhesive layer is in the range of 10 to 300 nm, and is greater than an average particle size of the colloidal metal compound contained in the adhesive layer. As a result of setting the thickness of the adhesive layer to be greater than an average particle size of the colloidal metal compound, it becomes possible to suppress irregularities of the adhesive layer in a thickness direction thereof to thereby form the adhesive layer with good adhesiveness.

The optical laminate of the present invention can also be deemed to comprise a polarizing film comprised of a polyvinyl alcohol-based resin having oriented iodine, and a sub-laminate.

In this case, the sub-laminate comprises at least an optically transparent adhesive layer and an optical film.

An optical laminate according to another aspect of the present invention is configured to increase an optical path length over which light reflected by the polarizing film travels until it exits to the outside, to thereby suppress reference unevenness. In general, as an optical path length difference between reflected light beams being interfering with each other becomes larger, a wavelength difference between a wavelength causing the two beams to be mutually strengthened and a wavelength causing the two beams to be mutually weakened becomes smaller, so that colors of the interfering beams are mixed and averaged, and the resulting interfering beam color becomes less likely to be visually recognized. Therefore, supposing interference between a beam reflected from a surface of the polarizing film and a beam reflected from a viewing-side outermost surface of the optical laminate, when a thickness of the sub-laminate is increased, an optical path length over which a beam reflected by the polarizing film travels until it exits to the outside is increased, and an optical path length difference between the beam reflected by the polarizing film and the beam reflected from the viewing-side outermost surface of the optical laminate becomes larger, so that color of the interfering beams becomes less likely to be visually recognized. That is, as a thickness of the optical laminate becomes larger, it becomes possible to more effectively suppress interference unevenness.

In the optical laminate using the polarizing film comprised of a polyvinyl alcohol-based resin having oriented iodine, according another aspect of the present invention, interference unevenness can be suppressed when the sub-laminate has a thickness of 60 μm or more. Preferably, the thickness of the sub-laminate is 60 μm or more, in view of a capability of more effectively suppressing interference unevenness.

An optical laminate according to a further aspect of the present invention is configured to scatter light reflected by the polarizing film to thereby suppress reference unevenness. A degree of scattering of light can be represented by a Haze value. As the degree of scattering becomes larger, it becomes possible to more effectively suppress interference unevenness, which means that, as a Haze value of the sub-laminate provided on a viewing side of the polarizing film becomes larger, it becomes possible to more effectively suppress interference unevenness.

In the optical laminate using the polarizing film comprised of a polyvinyl alcohol-based resin having oriented iodine, according the further aspect of the present invention, interference unevenness can be suppressed when the sub-laminate has a Haze value of 0.5% or more. Preferably, the Haze value of the sub-laminate is 1.5% or more, in view of a capability of more effectively suppressing interference unevenness. More preferably, the Haze value of the sub-laminate is 10% or more, in view of a capability of much more effectively suppressing interference unevenness.

As a construction for allowing the sub-laminate to have a Haze value of 0.5% or more, a layer having an antiglare function may be provided in the sub-laminate. For example, a layer containing organic and/or inorganic, scaly and irregular flaky particles and/or spherical particles may be provided. A microscopic asperity structure may be formed in a surface of the sub-laminate by an appropriate method such as embossing, sandblasting or etching.

[Display]

A display of the present invention comprises the aforementioned optical laminate. For example, it may be a liquid crystal display or an organic EL display.

EXAMPLES

The optical laminate of the present invention will be further described based on the following examples. It should be understood that the optical laminate of the present invention is not limited to these examples.

Inventive Example 1-1

A polarizing film in this Inventive Example was produced by the aforementioned two-stage stretching process.

An amorphous polyethylene terephthalate (hereinafter referred to as "PET") (IPA-copolymerized PET) film (thickness: 100 μm) with 7 mol % of isophthalic acid unit was used as a thermoplastic resin substrate, and a surface of the film was subjected to a corona treatment (58 W/m²/min). Further, a PVA (polymerization degree: 4200, saponification degree: 99.2%) added with 1 wt % of acetoacetyl-modified PVA (produced by Nippon Synthetic Chemical Industry Co., Ltd., trade name: Gohsefimer Z200 (polymerization degree: 1200, saponification degree: 98.5 mol %, acetoacetyl-modification degree: 5 mol %)) was used to preliminarily prepare a coating solution consisting of an aqueous PVA solution containing 5.5 wt % of PVA-based resin. Then, the coating solution was applied onto a substrate to allow a film thickness after drying to become 9 μm, and subjected to hot-air drying under an atmosphere at 60° C. for 10 minutes to prepare a laminate in which a layer of the PVA-based resin is provided on the substrate.

Then, this laminate was first subjected to free-end stretching in air (auxiliary in-air stretching) at 130° C. at a stretching ratio of 1.8 times to form a stretched laminate. Then, the stretched laminate was immersed in an insolubilization aqueous boric acid solution having a temperature of 30° C. for 30 seconds to perform a step of insolubilizing a PVA layer in which PVA molecules are oriented and which is comprised in the stretched laminate. The insolubilization aqueous boric acid solution in this step was prepared to allow a boric acid to be contained in an amount of 3 weight parts with respect to 100 weight parts of water. The stretched laminate was subjected to dyeing to form a dyed laminate. Specifically, the dyed laminate was prepared by immersing the stretched laminate in a dyeing solution containing iodine and potassium iodide and having a temperature of 30° C. for an arbitrary time, in such a manner that a single layer transmittance of a PVA layer making up a polarizing film to be finally obtained falls with the range of 40 to 44%, thereby causing the PVA layer comprised in the stretched laminate to be dyed with iodine. In this step, the dyeing solution was prepared using water as a solvent to allow an iodine concentration and a potassium iodide concentration to fall with the range of 0.1 to 0.4 weight %, and the range of 0.7 to 2.8 weight %, respectively. A concentration ratio of iodine to potassium iodide was 1:7. Then, a step of immersing the dyed laminate in a cross-linking aqueous boric acid solution at 30° C. for 60 seconds so as to subject PVA molecules in the PVA layer having iodine adsorbed therein to a cross-linking treatment was performed. The cross-linking aqueous boric acid solution in this step was set to contain boric acid in an amount of 3 weight parts with respect to 100 weight parts of water, and contain potassium iodide in an amount of 3 weight parts with respect to 100 weight parts of water.

Further, an obtained dyed laminate was stretched in an aqueous boric acid solution (in-boric-acid-solution stretching) at a stretching temperature of 70° C., at a stretching ratio of 3.05 times in the same direction as that during the previous in-air stretching to obtain an optical film laminate stretched at a final (total) stretching ratio of 5.50 times. The optical film laminate was taken out of the aqueous boric acid solution, and a boric acid attaching on a surface of the PVA layer was washed by an aqueous solution containing 4 weight parts of potassium iodide with respect to 100 weight pars of water. The washed optical film laminate was dried through a drying step using hot air at 60 degree. The polarizing film comprised in the obtained optical film laminate had a thickness of 3.7 μm.

A 40 μm-thick (meta) acrylic-based resin film having an easy-adhesion layer prepared in the following manner to have a thickness of about 300 nm and a refractive index of 1.50 was laminated to a surface of the PVA layer formed as a polarizing film on the amorphous polyethylene terephthalate substrate, while applying an adhesive prepared in the following manner to have a refractive index of 1.59, onto the surface of the polarizing film to allow a thickness of an adhesive layer after drying to become 80 nm, and then subjected to drying at 55° C. for 6 minutes. Then, the amorphous PET substrate was peeled, while allowing the polarizing film to be transferred to the 40 μm-thick (meta) acrylic-based resin film serving as a protective layer, to prepare an optical laminate.

The obtained polarizing film and optical laminate were subjected to various evaluations in the following manner. Properties of the obtained polarizing film and optical laminate are presented in Table 1.

Inventive Example 1-2

In this Inventive Example, a polarizing film and an optical laminate were produced and prepared under the same conditions as those in Inventive Example 1-1, except that the iodine and potassium iodide concentrations of the dyeing solution and the immersion time in the dyeing solution were set differently in order to obtain a polarizing film different in single layer transmittance and degree of polarization, and then subjected to various evaluations in the following manner. Properties of the obtained polarizing film and optical laminate are presented in Table 1.

Inventive Example 1-3

A polarizing film and an optical laminate were produced and prepared under the same conditions as those in Inventive Example 1-1, except for the following difference, and then subjected to various evaluations in the following manner. The difference is in thickness of the PVA layer formed on the PET substrate. In Inventive Example 1-1, a 9 μm-thick PVA layer was used, and finally formed as a 3.7 μm-thick polarizing film comprised in the optical film laminate, whereas, in Inventive Example 1-3, an 11 μm-thick PVA layer was used, and finally formed as a 4.7 μm-thick polarizing film comprised in the optical film laminate. Properties of the obtained polarizing film and optical laminate are presented in Table 1.

Inventive Example 1-4

A polarizing film and an optical laminate were produced and prepared under the same conditions as those in Inventive Example 1-1, except for the following difference, and then subjected to various evaluations in the following manner. The difference is in the thickness of the PVA layer formed on the PET substrate. In Inventive Example 1-1, a 9 μm-thick PVA layer was used, and finally formed as a 3.7 μm-thick polarizing film comprised in the optical film laminate, whereas, in Inventive Example 1-4, a 17 μm-thick PVA layer was used, and finally formed as a 6.9 μm-thick polarizing film comprised in the optical film laminate. Properties of the obtained polarizing film and optical laminate are presented in Table 1.

Inventive Example 1-5

Inventive Example 1-5 was prepared in the same manner as that in Inventive Example 1-1, except that, as the adhesive, a type having a refractive index of 1.56 was used, and then subjected to various evaluations in the following manner. Properties of an obtained polarizing film and optical laminate are presented in Table 1.

Inventive Example 1-6

Inventive Example 1-6 was prepared in the same manner as that in Inventive Example 1-2, except that, as the adhesive, a type having a refractive index of 1.56 was used, and then subjected to various evaluations in the following manner. Properties of an obtained polarizing film and optical laminate are presented in Table 1.

Inventive Example 1-7

Inventive Example 1-7 was prepared in the same manner as that in Inventive Example 1-2, except that, as the adhesive, a type having a refractive index of 1.55 was used, and then subjected to various evaluations in the following manner. Properties of an obtained polarizing film and optical laminate are presented in Table 1.

Inventive Example 1-8

Inventive Example 1-8 was prepared in the same manner as that in Inventive Example 1-3, except that, as the adhesive, a type having a refractive index of 1.56 was used, and then subjected to various evaluations in the following manner. Properties of an obtained polarizing film and optical laminate are presented in Table 1.

Inventive Example 1-9

Inventive Example 1-9 was prepared in the same manner as that in Inventive Example 1-4, except that, as the adhesive, a type having a refractive index of 1.56 was used, and then subjected to various evaluations in the following manner. Properties of an obtained polarizing film and optical laminate are presented in Table 1.

Inventive Example 1-10

A polarizing film and an optical laminate were produced and prepared under the same conditions as those in Inventive Example 1-1, except for the following differences, and then subjected to various evaluations in the following manner. The differences are in the stretching ratio in the boric acid solution, the thickness of the PVA layer formed on the PET substrate, and the refractive index of the adhesive layer. The stretching ratio in the boric acid solution was 3.05 times in Inventive Example 1-1, whereas it was 2.20 times in Inventive Example 1-10. Further, in Inventive Example 1-1, a 9 μm-thick PVA layer was used, and finally formed as a 3.7 μm-thick polarizing film comprised in the optical film laminate, whereas, in Inventive Example 1-10, a 17 μm-thick PVA layer was used, and finally formed as a 9.1 μm-thick polarizing film comprised in the optical film laminate. Furthermore, the adhesive layer of the optical laminate in Inventive Example 1-1 had a refractive index of 1.59, whereas the adhesive layer of the optical laminate in Inventive Example 1-10 had a refractive index of 1.60. Properties of the obtained polarizing film and optical laminate are presented in Table 1.

Inventive Example 1-11

Inventive Example 1-11 was prepared in the same manner as that in Inventive Example 1-10, except that, as the adhesive, a type having a refractive index of 1.59 was used, and then subjected to various evaluations in the following manner. Properties of an obtained polarizing film and optical laminate are presented in Table 1.

Inventive Example 1-12

A polarizing film and an optical laminate were produced and prepared under the same conditions as those in Inventive Example 1-5, except for the following difference, and then subjected to various evaluations in the following manner. The difference is in a material for the optical film bonded to the polarizing film through the adhesive layer. The material for the optical film in Inventive Example 1-5 was a (meta) acrylic-based resin film, whereas the material for the optical film in Inventive Example 1-12 was a 40 μm-thick triacetyl cellulose (TAC) film (produced by Konica Minolta Opt, Inc., trade name: "TAC FILM KC4UY"). The TAC film to be laminated is a type saponified in a heretofore-known manner. Properties of the obtained polarizing film and optical laminate are presented in Table 1.

Inventive Example 1-13

A polarizing film and an optical laminate were produced and prepared under the same conditions as those in Inventive Example 1-8, except for the following differences, and then subjected to various evaluations in the following manner. The differences are in the stretching ratios in the in-air stretching and the in-water stretching, the thickness of the PVA layer formed on the PET substrate, the iodine and potassium iodide concentrations of the dyeing solution and the immersion time in the dyeing solution. In Inventive Example 1-8, the stretching ratio in the in-air stretching and the stretching ratio in the in-water stretching were, respectively, 1.8 times and 3.05 times, whereas, in Inventive Example 1-13, the stretching ratio in the in-air stretching and the stretching ratio in the in-water stretching were, respectively, 2.0 times and 2.75 times. The final (total) stretching ratio was 5.50 times in both cases. Further, in Inventive Example 1-8, a 11 μm-thick PVA layer was used, and finally formed as a 4.7 μm-thick polarizing film comprised in the optical film laminate, whereas, in Inventive Example 1-13, an 11 μm-thick PVA layer was used, and finally formed as a 4.8 μm-thick polarizing film comprised in the optical film laminate. Furthermore, in Inventive Example 1-13, the iodine and potassium iodine concentrations and the immersion time in the dyeing solution were set differently from those in Inventive Example 1-8 in order to obtain a polarizing film different in single layer transmittance and degree of polarization. Properties of the obtained polarizing film and optical laminate are presented in Table 1.

Inventive Example 1-14

In this Inventive Example, a polarizing film and an optical laminate were produced and prepared under the same conditions as those in Inventive Example 1-5, except the iodine and potassium iodine concentrations of the dyeing solution and the immersion time in the dyeing solution were set differently in order to obtain a polarizing film different in single layer transmittance and degree of polarization, and then subjected to various evaluations in the following manner. Properties of the obtained polarizing film and optical laminate are presented in Table 1.

Inventive Example 1-15

In this Inventive Example, a polarizing film and an optical laminate were produced and prepared under the same conditions as those in Inventive Example 1-5, except that the iodine and potassium iodine concentrations of the dyeing solution and the immersion time in the dyeing solution were set differently in order to obtain a polarizing film different in single layer transmittance and degree of polarization, and then subjected to various evaluations in the following manner. Properties of the obtained polarizing film and optical laminate are presented in Table 1.

Inventive Example 1-16

In this Inventive Example, a polarizing film and an optical laminate were produced and prepared under the same conditions as those in Inventive Example 1-13, except that the iodine and potassium iodine concentrations of the dyeing solution and the immersion time in the dyeing solution were set differently in order to obtain a polarizing film different in single layer transmittance and degree of polarization, and, as the adhesive, a type having a refractive index of 1.60 was used, and then subjected to various evaluations in the following manner. Properties of the obtained polarizing film and optical laminate are presented in Table 1.

Inventive Example 1-17

A polarizing film in this Inventive Example was produced by the aforementioned in-air (dry) stretching process.

An amorphous polyethylene terephthalate (IPA-copolymerized PET) film with 7 mol % of isophthalic acid unit (thickness: 100 μm) was used as a thermoplastic resin substrate, and a surface of the film was subjected to a corona treatment (58 W/m$^2$/min). Further, a PVA (polymerization degree: 4200, saponification degree: 99.2%) added with 1 wt % of acetoacetyl-modified PVA (produced by Nippon Synthetic Chemical Industry Co., Ltd., trade name: Gohsefimer Z200 (polymerization degree: 1200, saponification degree: 98.5 mol %, acetoacetyl-modification degree: 5 mol %)) was used to preliminarily prepare a coating solution consisting of an aqueous PVA solution containing 5.5 wt % of PVA-based resin. Then, the coating solution was applied onto a substrate to allow a film thickness after drying to become 9 μm, and subjected to hot-air drying under an atmosphere at 60° C. for 10 minutes to prepare a laminate in which a layer of the PVA-based resin is provided on the substrate.

Then, this laminate was first subjected to free-end stretching in air at 130° C. at a stretching ratio of 4.0 times to form a stretched laminate. Then, the stretched laminate was subjected to dyeing to form a dyed laminate. Specifically, the dyed laminate was prepared by immersing the stretched laminate in a dyeing solution containing iodine and potassium iodide and having at a temperature of 30° C. for an arbitrary time, in such a manner that a single layer transmittance of a PVA layer making up a polarizing film to be finally formed falls with the range of 38 to 44%, thereby causing the PVA layer comprised in the stretched laminate to be dyed with iodine. In this step, the dyeing solution was prepared using water as a solvent to allow an iodine concentration and a potassium iodide concentration to fall with the range of 0.3 to 0.8 weight %, and the range of 2.1 to 5.6 weight %, respectively. A concentration ratio of iodine to potassium iodide is 1:7. Then, a step of immersing the dyed laminate in a cross-linking aqueous boric acid solution at 60° C. for 60 seconds so as to subject PVA molecules in the PVA layer having iodine adsorbed therein to a cross-linking treatment was performed. The cross-linking aqueous boric acid solution in this step was set to contain boric acid in an amount of 5 weight parts with respect to 100 weight parts of water, and contain potassium iodide in an amount of 5 weight parts with respect to 100 weight parts of water. An optical film laminate obtained through the cross-linking treatment was taken out of the aqueous boric acid solution, and a boric acid attaching on a surface of the PVA layer was washed by an aqueous solution containing 5 weight parts of potassium iodide with respect to 100 weight pars of water and having a temperature of 30° C. The washed optical film laminate was dried through a drying step using hot air at 60 degree. The polarizing film comprised in the obtained optical film laminate had a thickness of 5.6 μm.

A 40 μm-thick (meta) acrylic-based resin film having an easy-adhesion layer prepared in the following manner to have a thickness of about 300 nm and a refractive index of 1.50 was laminated to a surface of the PVA layer formed as a polarizing film on the amorphous polyethylene terephthalate substrate, while applying an adhesive prepared in the following manner to have a refractive index of 1.59, onto the surface of the polarizing film to allow a thickness of an adhesive layer after drying to become 80 nm, and then subjected to drying at 55° C. for 6 minutes. Then, the amorphous PET substrate was peeled, while allowing the polarizing film to be transferred to the 40 μm-thick (meta) acrylic-based resin film serving as a protective layer, to prepare an optical laminate.

The obtained polarizing film and optical laminate were subjected to various evaluations in the following manner. Properties of the obtained polarizing film and optical laminate are presented in Table 1.

Inventive Example 1-18

A polarizing film in this Inventive Example was produced by the aforementioned excessive dyeing and partial decolorization process, wherein partial decolorization and cross-linking are performed using the same bath.

A film "ARTON" produced by JSR Corporation (thickness: 100 μm) was used as a thermoplastic resin substrate, and a surface of the film was subjected to a corona treatment (58 W/m²/min) Further, a PVA (GOSENOL: NH-18 produced by Nippon Synthetic Chemical Industry Co., Ltd. (average polymerization degree: 2000, saponification degree: 98.5 mol %) was used to preliminarily prepare a coating solution consisting of an aqueous PVA solution containing 8 wt % of PVA-based resin. Then, the coating solution was applied onto a substrate to allow a film thickness after drying to become 7 μm, and subjected to hot-air drying under an atmosphere at 60° C. for 10 minutes to prepare a laminate in which a layer of the PVA-based resin is provided on the substrate.

Then, this laminate was first subjected to free-end stretching in air at 175° C. at a stretching ratio of 5.2 times to form a stretched laminate.

Then, the stretched laminate was subjected to dyeing to form a dyed laminate. Specifically, the dyed laminate was prepared by immersing the stretched laminate in a dyeing solution containing iodine and potassium iodide (solvent: water, iodine concentration: 1.0 weight %, potassium iodide concentration: 7.0 weight %) and having a temperature of 25° C. for arbitrary time of 120 sec or more.

Then, a step of immersing the dyed laminate in an aqueous boric acid solution at 75° C. for arbitrary time so as to subject cross-link between PVA molecules in the PVA layer having iodine adsorbed therein to cross-linking and simultaneously subject excess iodine in the dyed laminate to removing was performed. The aqueous boric acid solution in this step was set to contain boric acid in an amount of 10 weight parts with respect to 100 weight parts of water, and contain potassium iodide in an amount of 5 weight parts with respect to 100 weight parts of water. A transmittance of a polarizing film to be finally obtained was adjusted by the above immersion time.

An obtained dyed laminate was taken out of the aqueous boric acid solution, and a boric acid attaching on a surface of the PVA layer was washed by an aqueous solution containing 5 weight parts of potassium iodide with respect to 100 weight pars of water and having a temperature of 30° C. The washed dyed laminate was dried through a drying step using hot air at 60 degree. The polarizing film comprised in the obtained dyed laminate had a thickness of 3.8 μm.

A 40 μm-thick (meta) acrylic-based resin film having an easy-adhesion layer prepared in the following manner to have a thickness of about 300 nm and a refractive index of 1.50 was laminated to a surface of the PVA layer formed as a polarizing film on the ARTON substrate, while applying an adhesive prepared in the following manner to have a refractive index of 1.60, onto the surface of the polarizing film to allow a thickness of an adhesive layer after drying to become 80 nm, and then subjected to drying at 55° C. for 6 minutes. Then, the ARTON substrate was peeled, while allowing the polarizing film to be transferred to the 40 μm-thick (meta) acrylic-based resin film serving as a protective layer, to prepare an optical laminate.

The obtained polarizing film and optical laminate were subjected to various evaluations in the following manner. Properties of the obtained polarizing film and optical laminate are presented in Table 1.

Inventive Example 1-19

In this Inventive Example, a polarizing film and an optical laminate were produced and prepared under the same conditions as those in Inventive Example 1-18, except that the immersion time in the dyeing bath and the immersion time in the cross-linking and partial decolorization bath were set differently in order to obtain a polarizing film different in single layer transmittance and degree of polarization, and then subjected to various evaluations in the following manner. Properties of the obtained polarizing film and optical laminate are presented in Table 1.

Inventive Example 1-20

A polarizing film in this Inventive Example was produced by the aforementioned excessive dyeing and partial decolorization process, wherein partial decolorization and cross-linking are performed using separate baths.

A film "ARTON" produced by JSR Corporation (thickness: 100 μm) was used as a thermoplastic resin substrate, and a surface of the film was subjected to a corona treatment (58 W/m²/min) Further, a PVA (GOSENOL: NH-18 produced by Nippon Synthetic Chemical Industry Co., Ltd. (average polymerization degree: 2000, saponification degree: 98.5 mol %) was used to preliminarily prepare a coating solution consisting of an aqueous PVA solution containing 8 wt % of PVA-based resin. Then, the coating solution was applied onto a substrate to allow a film thickness after drying to become 7 μm, and subjected to hot-air drying under an atmosphere at 60° C. for 10 minutes to prepare a laminate in which a layer of the PVA-based resin is provided on the substrate.

Then, this laminate was first subjected to free-end stretching in air at 175° C. at a stretching ratio of 5.2 times to form a stretched laminate.

Then, the stretched laminate was subjected to dyeing to form a dyed laminate. Specifically, the dyed laminate was prepared by immersing the stretched laminate in a dyeing solution containing iodine and potassium iodide (solvent: water, iodine concentration: 1.0 weight %, potassium iodide concentration: 7.0 weight %) and having a temperature of 25° C. for 1 hour.

Then, a step of immersing the dyed laminate in an aqueous potassium iodide solution at 45° C. for arbitrary time so as to subject the dyed laminate to a treatment for removing excess iodine in the dyed laminate was performed. The aqueous potassium iodide solution in this step was set to contain potassium iodide in an amount of 5 weight parts with respect to 100 weight parts of water. A transmittance of a polarizing film to be finally obtained was adjusted by the above immersion time.

Then, a step of immersing the obtained dyed laminate in an aqueous boric acid solution at 60° C. for 60 seconds so as to subject PVA molecules in the PVA layer having iodine adsorbed therein to cross linking was performed. The aqueous boric acid solution in this step was set to contain a boric acid in an amount of 10 weight parts with respect to 100 weight parts of water, and contain potassium iodide in an amount of 5 weight parts with respect to 100 weight parts of water.

An obtained dyed laminate was taken out of the aqueous boric acid solution, and a boric acid attaching on a surface of the PVA layer was washed by an aqueous solution containing 5 weight parts of potassium iodide with respect to 100 weight parts of water and having a temperature of 30° C. The washed dyed laminate was dried through a drying step using hot air at 60 degree. The polarizing film comprised in the obtained dyed laminate had a thickness of 3.8 μm.

A 40 μm-thick (meta) acrylic-based resin film having an easy-adhesion layer prepared in the following manner to have a thickness of about 300 nm and a refractive index of 1.5 was laminated to a surface of the PVA layer formed as a polarizing film on the ARTON substrate, while applying an adhesive prepared in the following manner to have a refractive index of 1.59, onto the surface of the polarizing film to allow a thickness of an adhesive layer after drying to become 80 nm, and then subjected to drying at 55° C. for 6 minutes. Then, the ARTON substrate was peeled, while allowing the polarizing film to be transferred to the 40 μm-thick (meta) acrylic-based resin film serving as a protective layer, to prepare an optical laminate.

The obtained polarizing film and optical laminate were subjected to various evaluations in the following manner. Properties of the obtained polarizing film and optical laminate are presented in Table 1.

Inventive Example 1-21

In this Inventive Example, a polarizing film and an optical laminate were produced and prepared under the same conditions as those in Inventive Example 1-20, except that the immersion time in the partial decolorization bath after the dyeing was set differently in order to obtain a polarizing film different in single layer transmittance and degree of polarization, and, as the adhesive, a type having a refractive index of 1.60 was used, and then subjected to various evaluations in the following manner. Properties of the obtained polarizing film and optical laminate are presented in Table 1.

Inventive Example 1-22

In this Inventive Example, a polarizing film and an optical laminate were produced and prepared under the same conditions as those in Inventive Example 1-20, except that the immersion time in the partial decolorization bath after the dyeing was set differently in order to obtain a polarizing film different in single layer transmittance and degree of polarization, and, as the adhesive, a type having a refractive index of 1.60 was used, and then subjected to various evaluations in the following manner. Properties of the obtained polarizing film and optical laminate are presented in Table 1.

Comparative Example 1-1

Comparative Example 1-1 was prepared in the same manner as that in Inventive Example 1-1, except that, as the adhesive, a conventional type having a refractive index of 1.53 was used, and then subjected to various evaluations in the following manner. Properties of an obtained polarizing film and optical laminate are presented in Table 1.

Comparative Example 1-2

Comparative Example 1-2 was prepared in the same manner as that in Inventive Example 1-2, except that, as the adhesive, a conventional type having a refractive index of 1.53 was used, and then subjected to various evaluations in the following manner. Properties of an obtained polarizing film and optical laminate are presented in Table 1.

Comparative Example 1-3

Comparative Example 1-3 was prepared in the same manner as that in Inventive Example 1-3, except that, as the adhesive, a conventional type having a refractive index of 1.53 was used, and then subjected to various evaluations in the following manner. Properties of an obtained polarizing film and optical laminate are presented in Table 1.

Comparative Example 1-4

Comparative Example 1-4 was prepared in the same manner as that in Inventive Example 1-4, except that, as the adhesive, a conventional type having a refractive index of 1.53 was used, and then subjected to various evaluations in the following manner. Properties of an obtained polarizing film and optical laminate are presented in Table 1.

Comparative Example 1-5

Comparative Example 1-5 was prepared in the same manner as that in Inventive Example 1-10, except that, as the adhesive, a conventional type having a refractive index of 1.53 was used, and then subjected to various evaluations in the following manner. Properties of an obtained polarizing film and optical laminate are presented in Table 1.

Comparative Example 1-6

Comparative Example 1-6 was prepared in the same manner as that in Inventive Example 1-11, except that, as the adhesive, a type having a refractive index of 1.62 was used, and then subjected to various evaluations in the following manner. Properties of an obtained polarizing film and optical laminate are presented in Table 1.

Comparative Example 1-7

Comparative Example 1-7 was prepared in the same manner as that in Inventive Example 1-12, except that, as the adhesive, a conventional type having a refractive index of 1.53 was used, and then subjected to various evaluations in the following manner. Properties of an obtained polarizing film and optical laminate are presented in Table 1.

Comparative Example 1-8

Comparative Example 1-8 was prepared in the same manner as that in Inventive Example 1-13, except that, as the adhesive, a conventional type having a refractive index of 1.53 was used, and then subjected to various evaluations in the following manner. Properties of an obtained polarizing film and optical laminate are presented in Table 1.

Comparative Example 1-9

Comparative Example 1-9 was prepared in the same manner as that in Inventive Example 1-14, except that, as the adhesive, a conventional type having a refractive index of 1.53 was used, and then subjected to various evaluations in the following manner. Properties of an obtained polarizing film and optical laminate are presented in Table 1.

Comparative Example 1-10

Comparative Example 1-10 was prepared in the same manner as that in Inventive Example 1-15, except that, as the adhesive, a conventional type having a refractive index of 1.53 was used, and then subjected to various evaluations in the following manner. Properties of an obtained polarizing film and optical laminate are presented in Table 1.

Comparative Example 1-11

Comparative Example 1-11 was prepared in the same manner as that in Inventive Example 1-16, except that, as the adhesive, a conventional type having a refractive index of 1.53 was used, and then subjected to various evaluations in the following manner. Properties of an obtained polarizing film and optical laminate are presented in Table 1.

Comparative Example 1-12

Comparative Example 1-12 was prepared in the same manner as that in Inventive Example 1-17, except that, as the adhesive, a conventional type having a refractive index of 1.53 was used, and then subjected to various evaluations in the following manner. Properties of an obtained polarizing film and optical laminate are presented in Table 1.

Comparative Example 1-13

Comparative Example 1-13 was prepared in the same manner as that in Inventive Example 1-18, except that, as the adhesive, a conventional type having a refractive index of 1.53 was used, and then subjected to various evaluations in the following manner. Properties of an obtained polarizing film and optical laminate are presented in Table 1.

Comparative Example 1-14

Comparative Example 1-14 was prepared in the same manner as that in Inventive Example 1-19, except that, as the adhesive, a conventional type having a refractive index of 1.53 was used, and then subjected to various evaluations in the following manner. Properties of an obtained polarizing film and optical laminate are presented in Table 1.

Comparative Example 1-15

Comparative Example 1-15 was prepared in the same manner as that in Inventive Example 1-20, except that, as the adhesive, a conventional type having a refractive index of 1.53 was used, and then subjected to various evaluations in the following manner. Properties of an obtained polarizing film and optical laminate are presented in Table 1.

Comparative Example 1-16

Comparative Example 1-16 was prepared in the same manner as that in Inventive Example 1-21, except that, as the adhesive, a conventional type having a refractive index of 1.53 was used, and then subjected to various evaluations in the following manner. Properties of an obtained polarizing film and optical laminate are presented in Table 1.

Comparative Example 1-17

Comparative Example 1-17 was prepared in the same manner as that in Inventive Example 1-22, except that, as the adhesive, a conventional type having a refractive index of 1.53 was used, and then subjected to various evaluations in the following manner. Properties of an obtained polarizing film and optical laminate are presented in Table 1.

Conventional Example 1

A polarizing film in this Conventional Example was produced by the aforementioned single-layer stretching process.

A 40 µm-thick polyvinyl alcohol film was passed through between each of a plurality of sets of rolls having different circumferential velocities in such a manner as to be tensioned in a longitudinal direction thereof, while being sequentially immersed in the following five baths [1] to [5], so that it was stretched to attain a final stretching ratio of 6.0 times with respect to its original length. This stretched film was dried by an oven at 50° C. for 4 minutes to obtain a 17 µm-thick polarizing film.

[1] Swelling bath: Pure water at 30° C.
[2] Dyeing bath: An iodine concentration and a potassium iodide concentration were set, respectively, in the range of 0.02 to 0.2 weight % and in the range of 0.14 to 1.4 weight % with respect to 100 weight % of water. A concentration ratio of iodine to potassium iodide was 1:7. The above film was immersed in an aqueous solution containing them and having a temperature of 30° C. for an arbitrary time in such a manner that a single layer transmittance of a polarizing film to be finally obtained falls with the range of 40 to 44%.
[3] First cross-linking bath: An aqueous solution containing 3 weight % of potassium iodide and 3 weight % of iodide and having a temperature of 40° C.
[4] Second cross-linking bath: An aqueous solution containing 5 weight % of potassium iodide and 4 weight % of iodide and having a temperature of 60° C.
[5] Cleaning bath: An aqueous solution containing 3 weight % of potassium iodide having a temperature of 25° C.

A 40 µm-thick (meta) acrylic-based resin film having an easy-adhesion layer prepared in the following manner to have a thickness of about 300 nm and a refractive index of 1.50 was laminated to one surface of an obtained polarizing film, while applying an adhesive having a refractive index of 1.53, onto the one surface of the polarizing film to allow a thickness of an adhesive layer after drying to become 80 nm, and then subjected to drying at 55° C. for 6 minutes to prepare an optical laminate.

The obtained polarizing film and optical laminate were subjected to various evaluations in the following manner. Properties of the obtained polarizing film and optical laminate are presented in Table 1.

Conventional Example 2

In this conventional Example, a polarizing film and an optical laminate were produced and prepared under the same conditions as those in Conventional Example 1, except that the iodine and potassium iodide concentrations of the dyeing solution and the immersion time in the dyeing bath were set differently in order to obtain a polarizing film different in single layer transmittance and degree of polarization, and then subjected to various evaluations in the following manner. Properties of the obtained polarizing film and optical laminate are presented in Table 1.

Conventional Example 3

A polarizing film and an optical laminate were produced and prepared under the same conditions as those in Conventional Example 1, except for the following difference, and then subjected to various evaluations in the following manner. The difference is in thickness of the polyvinyl alcohol film. In Conventional Example 1, a 40 μm-thick polyvinyl alcohol film was used, and finally formed as a 17 μm-thick polarizing film, whereas, in Conventional Example 3, a 60 μm-thick polyvinyl alcohol film (produced by Kuraray Co., Ltd., trade name: "VF-PE #6000") was used, and finally formed as a 25 μm-thick polarizing film. Properties of the obtained polarizing film and optical laminate are presented in Table 1.

Inventive Example 2-1

A 60 μm-thick saponified triacetyl cellulose (TAC) film (produced by Konica Minolta Opt, Inc., trade name: "TAC FILM KC6UY", refractive index: 1.49) was laminated to a surface of the PVA layer obtained in Inventive Example 1-1 as a polarizing film formed on the amorphous PET substrate, while applying an adhesive prepared in the following manner to have a refractive index of 1.53, onto the surface of the polarizing film to allow a thickness of an adhesive layer after drying to become 80 nm, and then subjected to drying at 50° C. for 5 minutes. Then, the amorphous PET substrate was peeled, while allowing the polarizing film to be transferred to the 60 μm-thick TAC film serving as a protective layer, to prepare an optical laminate.

In Inventive Example 2-1, a sub-laminate consists of the 80 μm-thick adhesive layer and the 60 μm-thick TAC film, and a thickness of the sub-laminate is 60 μm.

Properties of the obtained polarizing film and optical laminate are presented in Table 2.

Inventive Example 2-2

An optical laminate was prepared in the same manner as that in Inventive Example 2-1, except that, as the above polarizing film, the 4.7 μm-thick polarizing film obtained in Inventive Example 1-3 was used. Properties of the obtained polarizing film and optical laminate are presented in Table 2.

Inventive Example 2-3

An optical laminate was prepared in the same manner as that in Inventive Example 2-1, except that, as the above polarizing film, the 6.9 μm-thick polarizing film obtained in Inventive Example 1-4 was used. Properties of the obtained polarizing film and optical laminate are presented in Table 2.

Inventive Example 2-4

An optical laminate was prepared in the same manner as that in Inventive Example 2-1, except that, as the above polarizing film, the 9.1 μm-thick polarizing film obtained in Inventive Example 1-10 was used. Properties of the obtained polarizing film and optical laminate are presented in Table 2.

Inventive Example 2-5

A polarizing film and an optical laminate were produced and prepared under the same conditions as those in Inventive Example 2-1, except for the following difference, and then subjected to various evaluations in the following manner. The difference is in a thickness of an optical film to be bonded to the polarizing film through the adhesive layer. The optical film in Inventive Example 2-1 was a 60 μm-thick saponified TAC film (produced by Konica Minolta Opt, Inc., trade name: "TAC FILM KC6UY", refractive index: 1.49). Differently, as the optical film in Inventive Example 2-5, an 80 μm-thick saponified triacetyl cellulose (TAC) film (produced by Fujifilm Corporation, trade name: "FUJITAC TD80UL", refractive index: 1.49) was used.

In Inventive Example 2-5, a sub-laminate consists of the 80 μm-thick adhesive layer and the 80 μm-thick TAC film, and a thickness of the sub-laminate is 80 μm.

Properties of the obtained polarizing film and optical laminate are presented in Table 2.

Inventive Example 2-6

A polarizing film and an optical laminate were produced and prepared under the same conditions as those in Inventive Example 2-2, except for the following difference, and then subjected to various evaluations in the following manner. The difference is in a thickness of an optical film to be bonded to the polarizing film through the adhesive layer. The optical film in Inventive Example 2-2 was a 60 μm-thick saponified TAC film (produced by Konica Minolta Opt, Inc., trade name: "TAC FILM KC6UY", refractive index: 1.49). Differently, as the optical film in Inventive Example 2-6, an 80 μm-thick saponified triacetyl cellulose (TAC) film (produced by Fujifilm Corporation, trade name: "FUJITAC TD80UL", refractive index: 1.49) was used. Properties of the obtained polarizing film and optical laminate are presented in Table 2.

Inventive Example 2-7

A polarizing film and an optical laminate were produced and prepared under the same conditions as those in Inventive Example 2-3, except for the following difference, and then subjected to various evaluations in the following manner. The difference is in a thickness of an optical film to be bonded to the polarizing film through the adhesive layer. The optical film in Inventive Example 2-3 was a 60 μm-thick saponified TAC film (produced by Konica Minolta Opt, Inc., trade name: "TAC FILM KC6UY", refractive index: 1.49). Differently, as the optical film in Inventive Example 2-7, an 80 μm-thick saponified triacetyl cellulose (TAC) film (produced by Fujifilm Corporation, trade name: "FUJITAC TD80UL", refractive index: 1.49) was used. Properties of the obtained polarizing film and optical laminate are presented in Table 2.

Inventive Example 2-8

A polarizing film and an optical laminate were produced and prepared under the same conditions as those in Inventive Example 2-4, except for the following difference, and then subjected to various evaluations in the following manner. The difference is in a thickness of an optical film to be bonded to the polarizing film through the adhesive layer. The optical film in Inventive Example 2-4 was a 60 μm-thick saponified TAC film (produced by Konica Minolta Opt, Inc., trade name: "TAC FILM KC6UY", refractive index: 1.49). Differently, as the optical film in Inventive Example 2-8, an 80 μm-thick saponified triacetyl cellulose (TAC) film (produced by Fujifilm Corporation, trade name: "FUJITAC TD80UL", refractive index: 1.49) was used. Properties of the obtained polarizing film and optical laminate are presented in Table 2.

Inventive Example 2-9

A polarizing film and an optical laminate were produced and prepared under the same conditions as those in Inventive Example 2-2, except for the following difference, and then subjected to various evaluations in the following manner. The difference is in a configuration of the optical laminate. The optical laminate in Inventive Example 2-9 was obtained by laminating a 32 μm-thick λ/4 retardation film (produced by ZEON Corporation, trade name: "ZEONOR FILM ZD12") to a surface of the TAC film on a side opposite to the polarizing film in the optical laminate obtained in Inventive Example 2-2, through an acrylic-based pressure sensitive-adhesive having a dry thickness of 20 μm, in such a manner as to allow an angle between an absorption axis of the polarizing film and a slow axis of the λ/4 retardation film to become 45 degrees.

In Inventive Example 2-9, a sub-laminate consists of the 80 μm-thick adhesive layer, the 60 μm-thick TAC film, and the 20 μm-thick pressure sensitive-adhesive layer, and the 32 μm-thick λ/4 retardation film, and a thickness of the sub-laminate is 112 μm.

Properties of the obtained polarizing film and optical laminate are presented in Table 2.

Inventive Example 2-10

A 40 μm-thick saponified triacetyl cellulose (TAC) film (produced by Konica Minolta Opt, Inc., trade name: "TAC FILM KC4UY", refractive index: 1.49) was laminated to a surface of the PVA layer obtained in Inventive Example 1-1 as a polarizing film formed on the amorphous PET substrate, while applying an adhesive prepared in the following manner to have a refractive index of 1.53, onto the surface of the polarizing film to allow a thickness of an adhesive layer after drying to become 80 nm, and then subjected to drying at 50° C. for 5 minutes. Then, the amorphous PET substrate was peeled, while allowing the polarizing film to be transferred to the 40 μm-thick TAC film serving as a protective layer, to prepare an optical laminate. Further, a 1.00 mm-thick Gorilla glass (produced by Corning Inc., trade name "Gorilla") is laminated to a surface of the TAC film on a side opposite to the polarizing film through an acrylic-based pressure sensitive-adhesive having a dry thickness of 100 μm to prepare an optical laminate.

In Inventive Example 2-10, a sub-laminate consists of the 80 μm-thick adhesive layer, the 40 μm-thick TAC film, and the 100 μm-thick pressure sensitive-adhesive layer, and the 1.00 mm-thick Gorilla glass, and a thickness of the sub-laminate is 1140 nm.

Properties of the obtained polarizing film and optical laminate are presented in Table 2.

Inventive Example 2-11

An optical laminate was prepared in the same manner as that in Inventive Example 2-10, except that, as the adhesive for laminating the TAC film to the Gorilla glass therethrough, a urethane acrylate-based ultraviolet curable adhesive was used.

In Inventive Example 2-11, a sub-laminate consists of the 80 μm-thick adhesive layer, the 40 μm-thick TAC film, and the 100 μm-thick adhesive layer, and the 1.00 mm-thick Gorilla glass, and a thickness of the sub-laminate is 1140 nm.

Properties of the obtained polarizing film and optical laminate are presented in Table 2.

Inventive Example 2-12

An optical laminate was prepared in the same manner as that in Inventive Example 2-1, except that, as the above polarizing film, the 3.8 μm-thick polarizing film obtained in Inventive Example 1-18 as a film formed on the ARTON substrate was used. Properties of the obtained polarizing film and optical laminate are presented in Table 2.

Inventive Example 2-13

An optical laminate was prepared in the same manner as that in Inventive Example 2-1, except that, as the above polarizing film, the 3.8 μm-thick polarizing film obtained in Inventive Example 1-20 as a film formed on the ARTON substrate was used. Properties of the obtained polarizing film and optical laminate are presented in Table 2.

Comparative Example 2-1

A polarizing film and an optical laminate were produced and prepared under the same conditions as those in Inventive Example 2-1, except for the following difference, and then subjected to various evaluations in the following manner. The difference is in a thickness of an optical film to be bonded to the polarizing film through the adhesive layer. The optical film in Inventive Example 2-1 was a 60 μm-thick saponified TAC film (produced by Konica Minolta Opt, Inc., trade name: "TAC FILM KC6UY", refractive index: 1.49). Differently, as the optical film in Comparative Example 2-1, a 40 μm-thick saponified triacetyl cellulose (TAC) film (produced by Konica Minolta Opt, Inc., trade name: "TAC FILM KC4UY", refractive index: 1.49) was used. Properties of the obtained polarizing film and optical laminate are presented in Table 2.

Comparative Example 2-2

A polarizing film and an optical laminate were produced and prepared under the same conditions as those in Inventive Example 2-2, except for the following difference, and then subjected to various evaluations in the following manner. The difference is in a thickness of an optical film to be bonded to the polarizing film through the adhesive layer. The optical film in Inventive Example 2-2 was a 60 μm-thick saponified TAC film (produced by Konica Minolta Opt, Inc., trade name: "TAC FILM KC6UY", refractive index: 1.49). Differently, as the optical film in Comparative Example 2-2, a 40 μm-thick saponified triacetyl cellulose (TAC) film (produced by Konica Minolta Opt, Inc., trade name: "TAC FILM KC4UY", refractive index: 1.49) was used. Properties of the obtained polarizing film and optical laminate are presented in Table 2.

Comparative Example 2-3

A polarizing film and an optical laminate were produced and prepared under the same conditions as those in Inventive Example 2-3, except for the following difference, and then subjected to various evaluations in the following manner. The difference is in a thickness of an optical film to be bonded to the polarizing film through the adhesive layer. The optical film in Inventive Example 2-3 was a 60 μm-thick saponified TAC film (produced by Konica Minolta Opt, Inc., trade name: "TAC FILM KC6UY", refractive index: 1.49). Differently, as the optical film in Comparative Example 2-3, a 40 μm-thick saponified triacetyl cellulose (TAC) film (produced by Konica Minolta Opt, Inc., trade name: "TAC FILM KC4UY", refractive index: 1.49) was used. Properties of the obtained polarizing film and optical laminate are presented in Table 2.

Comparative Example 2-4

A polarizing film and an optical laminate were produced and prepared under the same conditions as those in Inventive Example 2-4, except for the following difference, and then subjected to various evaluations in the following manner. The difference is in a thickness of an optical film to be bonded to the polarizing film through the adhesive layer. The optical film in Inventive Example 2-4 was a 60 μm-thick saponified TAC film (produced by Konica Minolta Opt, Inc., trade name: "TAC FILM KC6UY", refractive index: 1.49). Differently, as the optical film in Comparative Example 2-4, a 40 μm-thick saponified triacetyl cellulose (TAC) film (produced by Konica Minolta Opt, Inc., trade name: "TAC FILM KC4UY", refractive index: 1.49) was used. Properties of the obtained polarizing film and optical laminate are presented in Table 2.

Comparative Example 2-5

A polarizing film and an optical laminate were produced and prepared under the same conditions as those in Inventive Example 2-12, except for the following difference, and then subjected to various evaluations in the following manner. The difference is in a thickness of an optical film to be bonded to the polarizing film through the adhesive layer. The optical film in Inventive Example 2-12 was a 60 μm-thick saponified TAC film (produced by Konica Minolta Opt, Inc., trade name: "TAC FILM KC6UY", refractive index: 1.49). Differently, as the optical film in Comparative Example 2-5, a 40 μm-thick saponified triacetyl cellulose (TAC) film (produced by Konica Minolta Opt, Inc., trade name: "TAC FILM KC4UY", refractive index: 1.49) was used. Properties of the obtained polarizing film and optical laminate are presented in Table 2.

Comparative Example 2-6

A polarizing film and an optical laminate were produced and prepared under the same conditions as those in Inventive Example 2-13, except for the following difference, and then subjected to various evaluations in the following manner. The difference is in a thickness of an optical film to be bonded to the polarizing film through the adhesive layer. The optical film in Inventive Example 2-13 was a 60 μm-thick saponified TAC film (produced by Konica Minolta Opt, Inc., trade name: "TAC FILM KC6UY", refractive index: 1.49). Differently, as the optical film in Comparative Example 2-6, a 40 μm-thick saponified triacetyl cellulose (TAC) film (produced by Konica Minolta Opt, Inc., trade name: "TAC FILM KC4UY", refractive index: 1.49) was used. Properties of the obtained polarizing film and optical laminate are presented in Table 2.

Inventive Example 3-1

The PVA layer obtained in Inventive Example 1-1 as a polarizing film formed on the amorphous PET substrate was used, and an antiglare-layer-coated protective layer prepared in the following manner which comprises a 40 μm-thick TAC film and an antiglare layer having a Haze value of 0.5% and formed on one of opposite surfaces of the TAC film was laminated to a surface of the polarizing film in such a manner as to allow the other surface of the TAC film to become opposed to the surface of the polarizing film, while applying an adhesive prepared in the following manner to have a refractive index of 1.53, onto the surface of the polarizing film to allow a thickness of an adhesive layer after drying to become 80 nm, and then subjected to drying at 50° C. for 5 minutes. Then, the amorphous PET substrate was peeled, while allowing the polarizing film to be transferred to the antiglare-layer-coated protective layer to prepare an optical laminate. Properties of the obtained polarizing film and optical laminate are presented in Table 3.

Inventive Example 3-2

An optical laminate was prepared in the same manner as that in Inventive Example 3-1, except that, as the above polarizing film, the 4.7 μm-thick polarizing film obtained in Inventive Example 1-3 was used. Properties of the obtained polarizing film and optical laminate are presented in Table 3.

Inventive Example 3-3

An optical laminate was prepared in the same manner as that in Inventive Example 3-1, except that, as the above polarizing film, the 6.9 μm-thick polarizing film obtained in Inventive Example 1-4 was used. Properties of the obtained polarizing film and optical laminate are presented in Table 3.

Inventive Example 3-4

An optical laminate was prepared in the same manner as that in Inventive Example 3-1, except that, as the above polarizing film, the 9.1 μm-thick polarizing film obtained in Inventive Example 1-10 was used. Properties of the obtained polarizing film and optical laminate are presented in Table 3.

Inventive Example 3-5

A polarizing film and an optical laminate were produced and prepared under the same conditions as those in Inventive Example 3-1, except for the following difference, and then subjected to various evaluations in the following manner. The difference is in the Haze value of the antiglare layer. The Haze value of the antiglare layer in Inventive Example 3-1 was 0.5%. Differently, in Inventive Example 3-5, an antiglare-layer-coated protective layer prepared in the following manner to have a Haze value of 1.5% was used. Properties of the obtained polarizing film and optical laminate are presented in Table 3.

Inventive Example 3-6

An optical laminate was prepared in the same manner as that in Inventive Example 3-5, except that, as the above polarizing film, the 4.7 μm-thick polarizing film obtained in Inventive Example 1-3 was used. Properties of the obtained polarizing film and optical laminate are presented in Table 3.

Inventive Example 3-7

An optical laminate was prepared in the same manner as that in Inventive Example 3-5, except that, as the above polarizing film, the 6.9 μm-thick polarizing film obtained in Inventive Example 1-4 was used. Properties of the obtained polarizing film and optical laminate are presented in Table 3.

Inventive Example 3-8

An optical laminate was prepared in the same manner as that in Inventive Example 3-5, except that, as the above polarizing film, the 9.1 μm-thick polarizing film obtained in Inventive Example 1-10 was used. Properties of the obtained polarizing film and optical laminate are presented in Table 3.

Inventive Example 3-9

A polarizing film and an optical laminate were produced and prepared under the same conditions as those in Inventive Example 3-2, except for the following difference, and then subjected to various evaluations in the following manner. The difference is in the Haze value of the antiglare layer. The Haze value of the antiglare layer in Inventive Example 3-2 was 0.5%. Differently, in Inventive Example 3-9, an antiglare-layer-coated protective layer prepared in the following manner to have a Haze value of 12% was used. Properties of the obtained polarizing film and optical laminate are presented in Table 3.

Inventive Example 3-10

A polarizing film and an optical laminate were produced and prepared under the same conditions as those in Inventive Example 3-2, except for the following difference, and then subjected to various evaluations in the following manner. The difference is in the Haze value of the antiglare layer. The Haze value of the antiglare layer in Inventive Example 3-2 was 0.5%. Differently, in Inventive Example 3-10, an antiglare-layer-coated protective layer prepared in the following manner to have a Haze value of 25% was used. Properties of the obtained polarizing film and optical laminate are presented in Table 3.

Inventive Example 3-11

The PVA layer obtained in Inventive Example 1-18 as a polarizing film formed on the ARTON substrate was used, and an antiglare-layer-coated protective layer prepared in the following manner which comprises a 40 μm-thick TAC film and an antiglare layer having a Haze value of 1.5% and formed on one of opposite surfaces of the TAC film was laminated to a surface of the polarizing film in such a manner as to allow the other surface of the TAC film to become opposed to the surface of the polarizing film, while applying an adhesive prepared in the following manner to have a refractive index of 1.53, onto the surface of the polarizing film to allow a thickness of an adhesive layer after drying to become 80 nm, and then subjected to drying at 50° C. for 5 minutes. Then, the ARTON substrate was peeled, while allowing the polarizing film to be transferred to the antiglare-layer-coated protective layer to prepare an optical laminate. Properties of the obtained polarizing film and optical laminate are presented in Table 3.

Inventive Example 3-12

The PVA layer obtained in Inventive Example 1-20 as a polarizing film formed on the ARTON substrate was used, and an antiglare-layer-coated protective layer prepared in the following manner which comprises a 40 μm-thick TAC film and an antiglare layer having a Haze value of 0.5% and formed on one of opposite surfaces of the TAC film was laminated to a surface of the polarizing film in such a manner as to allow the other surface of the TAC film to become opposed to the surface of the polarizing film, while applying an adhesive prepared in the following manner to have a refractive index of 1.53, onto the surface of the polarizing film to allow a thickness of an adhesive layer after drying to become 80 nm, and then subjected to drying at 50° C. for 5 minutes. Then, the ARTON substrate was peeled, while allowing the polarizing film to be transferred to the antiglare-layer-coated protective layer to prepare an optical laminate. Properties of the obtained polarizing film and optical laminate are presented in Table 3.

Comparative Example 3-1

A polarizing film and an optical laminate were produced and prepared under the same conditions as those in Inventive Example 3-1, except for the following difference, and then subjected to various evaluations in the following manner. The difference is in the presence or absence of the antiglare layer of the protective layer to be bonded to the polarizing film through the adhesive. The protective layer in Inventive Example 3-1 was a 40 μm-thick TAC film (produced by Fujifilm Corporation, trade name: "FUJITAC T40UZ", refractive index: 1.49) with an antiglare layer having a Haze value of 0.5% and formed on one surface thereof. Differently, in Comparative Example 3-1, a 40 μm-thick TAC film (produced by Fujifilm Corporation, trade name: "FUJITAC T40UZ", refractive index: 1.49) with no antiglare layer was used as the protective layer. Properties of the obtained polarizing film and optical laminate are presented in Table 3.

Comparative Example 3-2

A polarizing film and an optical laminate were produced and prepared under the same conditions as those in Inventive Example 3-2, except for the following difference, and then subjected to various evaluations in the following manner. The difference is in the presence or absence of the antiglare layer of the protective layer to be bonded to the polarizing film through the adhesive. The protective layer in Inventive Example 3-2 was a 40 μm-thick TAC film (produced by Fujifilm Corporation, trade name: "FUJITAC T40UZ", refractive index: 1.49) with an antiglare layer having a Haze value of 0.5% and formed on one surface thereof. Differently, in Comparative Example 3-2, a 40 μm-thick TAC film (produced by Fujifilm Corporation, trade name: "FUJITAC T40UZ", refractive index: 1.49) with no antiglare layer was used as the protective layer. Properties of the obtained polarizing film and optical laminate are presented in Table 3.

Comparative Example 3-3

A polarizing film and an optical laminate were produced and prepared under the same conditions as those in Inventive Example 3-3, except for the following difference, and then subjected to various evaluations in the following manner. The difference is in the presence or absence of the antiglare layer of the protective layer to be bonded to the polarizing film through the adhesive. The protective layer in Inventive Example 3-3 was a 40 μm-thick TAC film (produced by Fujifilm Corporation, trade name: "FUJITAC T40UZ", refractive index: 1.49) with an antiglare layer having a Haze value of 0.5% and formed on one surface thereof. Differently, in Comparative Example 3-3, a 40 μm-thick TAC film (produced by Fujifilm Corporation, trade name: "FUJITAC T40UZ", refractive index: 1.49) with no antiglare layer was used as the protective layer. Properties of the obtained polarizing film and optical laminate are presented in Table 3.

Comparative Example 3-4

A polarizing film and an optical laminate were produced and prepared under the same conditions as those in Inventive Example 3-4, except for the following difference, and then subjected to various evaluations in the following manner. The difference is in the presence or absence of the antiglare layer of the protective layer to be bonded to the polarizing film through the adhesive. The protective layer in Inventive Example 3-4 was a 40 µm-thick TAC film (produced by Fujifilm Corporation, trade name: "FUJITAC T40UZ", refractive index: 1.49) with an antiglare layer having a Haze value of 0.5% and formed on one surface thereof. Differently, in Comparative Example 3-4, a 40 µm-thick TAC film (produced by Fujifilm Corporation, trade name: "FUJITAC T40UZ", refractive index: 1.49) with no antiglare layer was used as the protective layer. Properties of the obtained polarizing film and optical laminate are presented in Table 3.

Comparative Example 3-5

A polarizing film and an optical laminate were produced and prepared under the same conditions as those in Inventive Example 3-11, except for the following difference, and then subjected to various evaluations in the following manner. The difference is in the presence or absence of the antiglare layer of the protective layer to be bonded to the polarizing film through the adhesive. The protective layer in Inventive Example 3-11 was a 40 µm-thick TAC film (produced by Fujifilm Corporation, trade name: "FUJITAC T40UZ", refractive index: 1.49) with an antiglare layer having a Haze value of 1.5% and formed on one surface thereof. Differently, in Comparative Example 3-5, a 40 µm-thick TAC film (produced by Fujifilm Corporation, trade name: "FUJITAC T40UZ", refractive index: 1.49) with no antiglare layer was used as the protective layer. Properties of the obtained polarizing film and optical laminate are presented in Table 3.

Comparative Example 3-6

A polarizing film and an optical laminate were produced and prepared under the same conditions as those in Inventive Example 3-12, except for the following difference, and then subjected to various evaluations in the following manner. The difference is in the presence or absence of the antiglare layer of the protective layer to be bonded to the polarizing film through the adhesive. The protective layer in Inventive Example 3-12 was a 40 µm-thick TAC film (produced by Fujifilm Corporation, trade name: "FUJITAC T40UZ", refractive index: 1.49) with an antiglare layer having a Haze value of 1.5% and formed on one surface thereof. Differently, in Comparative Example 3-6, a 40 µm-thick TAC film (produced by Fujifilm Corporation, trade name: "FUJITAC T40UZ", refractive index: 1.49) with no antiglare layer was used as the protective layer. Properties of the obtained polarizing film and optical laminate are presented in Table 3.

(Preparation of Adhesive)

First of all, preparation of a conventional adhesive will be described. A polyvinyl alcohol-based resin (average polymerization degree: 1200, saponification degree: 98.5 mol %, acetoacetylation degree: 5 mol %) containing an acetoacetyl group was dissolved in pure water together with 50 parts of methylol melamine with respect to 100 parts of the polyvinyl alcohol-based resin, under a temperature of 30° C., to prepare an aqueous solution with an adjusted solid content concentration of 3.7% and obtain an adhesive having a refractive index of 1.53.

Next, preparation of an adhesive for Inventive Examples will be described. A polyvinyl alcohol-based resin (average polymerization degree: 1200, saponification degree: 98.5 mol %, acetoacetylation degree: 5 mol %) containing an acetoacetyl group was dissolved in pure water together with 50 parts of methylol melamine with respect to 100 parts of the polyvinyl alcohol-based resin, under a temperature of 30° C. to prepare an aqueous solution with an adjusted solid content concentration of 3.7%. Then, 12 parts of aqueous solution of colloidal alumina (average particle size: 15 nm, solid content concentration: 10%) was added to 100 parts of the prepared aqueous solution to prepare an aqueous adhesive solution to obtain an adhesive having a refractive index of 1.55.

Further, a polyvinyl alcohol-based resin (average polymerization degree: 1200, saponification degree: 98.5 mol %, acetoacetylation degree: 5 mol %) containing an acetoacetyl group was dissolved in pure water together with 50 parts of methylol melamine with respect to 100 parts of the polyvinyl alcohol-based resin, under a temperature of 30° C. to prepare an aqueous solution with an adjusted solid content concentration of 3.7%. Then, 18 parts of aqueous solution of colloidal alumina (average particle size: 15 nm, solid content concentration: 10%) was added to 100 parts of the prepared aqueous solution to prepare an aqueous adhesive solution to obtain an adhesive having a refractive index of 1.56.

Further, a polyvinyl alcohol-based resin (average polymerization degree: 1200, saponification degree: 98.5 mol %, acetoacetylation degree: 5 mol %) containing an acetoacetyl group was dissolved in pure water together with 50 parts of methylol melamine with respect to 100 parts of the polyvinyl alcohol-based resin, under a temperature of 30° C. to prepare an aqueous solution with an adjusted solid content concentration of 3.7%. Then, 13 parts of aqueous solution of colloidal zirconia (average particle size: 10 nm, solid content concentration: 6%) was added to 100 parts of the prepared aqueous solution to prepare an aqueous adhesive solution to obtain an adhesive having a refractive index of 1.59.

Further, a polyvinyl alcohol-based resin (average polymerization degree: 1200, saponification degree: 98.5 mol %, acetoacetylation degree: 5 mol %) containing an acetoacetyl group was dissolved in pure water together with 50 parts of methylol melamine with respect to 100 parts of the polyvinyl alcohol-based resin, under a temperature of 30° C. to prepare an aqueous solution with an adjusted solid content concentration of 3.7%. Then, 15.3 parts of aqueous solution of colloidal zirconia (average particle size: 10 nm, solid content concentration: 6%) was added to 100 parts of the prepared aqueous solution to prepare an aqueous adhesive solution to obtain an adhesive having a refractive index of 1.60.

Further, a polyvinyl alcohol-based resin (average polymerization degree: 1200, saponification degree: 98.5 mol %, acetoacetylation degree: 5 mol %) containing an acetoacetyl group was dissolved in pure water together with 50 parts of methylol melamine with respect to 100 parts of the polyvinyl alcohol-based resin, under a temperature of 30° C. to prepare an aqueous solution with an adjusted solid content concentration of 3.7%. Then, 20 parts of aqueous solution of colloidal zirconia (average particle size: 10 nm, solid content concentration: 6%) was added to 100 parts of the prepared aqueous solution to prepare an aqueous adhesive solution to obtain an adhesive having a refractive index of 1.62.

(Production of (Meta) Acrylic-Based Resin Film with Easy-Adhesion Layer)

A (meta) acrylic-based resin was formed by melt extrusion, and subsequently coated with an easy-adhesion layer. Then, the (meta) acrylic-based resin coated with the easy-adhesion layer was dried to obtain a 40 µm-thick (meta) acrylic-based resin film with a 300 µm-thick easy-adhesion layer. Each of the (meta) acrylic-based resin film and the easy-adhesion layer had a refractive index of 1.50.

(Preparation of Antiglare-Layer-Coated Protective Layer)

<Antiglare-Layer-Coated Protective Layer Having Haze Value of 0.5%>

First of all, as a resin to be contained in an antiglare layer forming material, 80 weight parts of ultraviolet curable urethane acrylate resin (produced by Nippon Synthetic Chemical Industry Co., Ltd., trade name: "UV1700B", solid content: 100%) and 20 weight parts of multifunctional acrylate (produced by Osaka Organic Chemical Industry Ltd., trade name: "VISCOAT#300", solid content: 100%) comprising a primary component consisting of pentaerythritol triacrylate were used. With respect to 100 weight parts of resin solid content of the above resin, 1 weight part of acryl-styrene copolymer particles (produced by Sekisui Plastics Co., Ltd., trade name: "TECHPOLYMER", weight-average particle size: 5.0 μm, refractive index: 1.520) serving as the above particles, 1.5 weight parts of synthesized smectite (produced by CO-OP Chemical Co. Ltd., trade name: "LUCENTITE SAN") which is organoclay and serves as a thixotropy-imparting agent, 3 weight parts of photopolymerization initiator (produced by BASF Corporation, trade name: "IRGACURE 907"), and 0.5 weight parts of leveling agent (produced by DIC Corporation, trade name: "PC4100", solid content: 10%), were mixed together. The organoclay was diluted with toluene to allow a solid content thereof to become 6.0%, and then used. The above mixture was diluted with a toluene/cyclopentanone (CPN) mixed solvent (weight ratio: 80/20) to allow a solid concentration thereof to become 40 weight % to thereby prepare an antiglare layer forming material (coating solution).

Then, as a translucent substrate, a transparent plastic film substrate (a triacetylcellulose film produced by Fujifilm Corporation, trade name "FUJITAC", thickness: 40 μm, refractive index: 1.49) was used. The antiglare layer forming material (coating solution) was applied to one surface of the transparent plastic film substrate using a comma coater. Then, the transparent plastic film substrate formed with the coated film was conveyed to a drying process while being tilted by an angle of about 30 degrees. In the drying process, the substrate was heated at 90° C. for 2 minutes to dry the coated film. Subsequently, the substrate was irradiated with ultraviolet from a high-pressure mercury lamp by a cumulative light amount of 300 mJ/cm$^2$, to cure the coated film to thereby form a 7.5 μm-thick antiglare layer to obtain an antiglare-layer-coated protective layer having a Haze value of 0.5%.

<Antiglare-Layer-Coated Protective Layer Having Haze Value of 1.5%>

First of all, as a resin to be contained in a an antiglare layer forming material 80 weight parts of ultraviolet curable urethane acrylate resin (produced by Nippon Synthetic Chemical Industry Co., Ltd., trade name: "UV1700B", solid content: 100%) and 20 weight parts of multifunctional acrylate (produced by Osaka Organic Chemical Industry Ltd., trade name: "VISCOAT#300", solid content: 100%) comprising a primary component consisting of pentaerythritol triacrylate were used. With respect to 100 weight parts of resin solid content of the above resin, 3 weight parts of acryl-styrene copolymer particles (produced by Sekisui Plastics Co., Ltd., trade name: "TECHPOLYMER", weight-average particle size: 5.0 μm, refractive index: 1.520) serving as the above particles, 1.5 weight parts of synthesized smectite (produced by CO-OP Chemical Co. Ltd., trade name: "LUCENTITE SAN") which is organoclay and serves as the thixotropy-imparting agent, 3 weight parts of photopolymerization initiator (produced by BASF Corporation, trade name: "IRGACURE 907"), and 0.5 weight parts of leveling agent (produced by DIC Corporation, trade name: "PC4100", solid content: 10%), were mixed together. The organoclay was diluted with toluene to allow a solid content thereof to become 6.0%, and then used. The above mixture was diluted with a toluene/cyclopentanone (CPN) mixed solvent (weight ratio: 80/20) to allow a solid concentration thereof to become 40 weight % to thereby prepare an antiglare layer forming material (coating solution).

Then, as a translucent substrate, a transparent plastic film substrate (a triacetylcellulose film produced by Fujifilm Corporation, trade name "FUJITAC", thickness: 40 μm, refractive index: 1.49) was used. The antiglare layer forming material (coating solution) was applied to one surface of the transparent plastic film substrate using a comma coater. Then, the transparent plastic film substrate formed with the coated film was conveyed to a drying process while being tilted by an angle of about 30 degrees. In the drying process, the substrate was heated at 90° C. for 2 minutes to dry the coated film. Subsequently, the substrate was irradiated with ultraviolet from a high-pressure mercury lamp by a cumulative light amount of 300 mJ/cm$^2$, to cure the coated film to thereby form a 7.5 μm-thick antiglare layer to obtain an antiglare-layer-coated protective layer having a Haze value of 1.5%.

<Antiglare-Layer-Coated Protective Layer Having Haze Value of 12%>

First of all, a hard coat layer forming material (produced by JSR Corporation, trade name: "OPSTAR Z7540", solids content: 56 weight %, solvent: butyl acetate/methyl ethyl ketone (MEK)=76/24 (weight ratio)) comprising aftermentioned components (A), and silica nanoparticles (aftermentioned component (B)) formed by coupling inorganic oxide particles and a polymerizable unsaturated group-containing organic compound together and dispersed therein was used. The hard coat layer forming material contains: components (A): dipentaerythritol and isophorone diisocyanate-based polyurethane; and a component (B): silica fine particles (weight-average particle size: 100 nm or less) whose surface is modified with an organic molecule, wherein a weight ratio of a total of the components (A) to the component (B) is 2:3. A refractive index of a hardened coat of the hard coat layer forming material was 1.485. With respect to 100 weight parts of the resin solid content in the hard coat layer forming material, 5 weight parts of acryl-styrene cross-linked particles (produced by Sekisui Chemical Co., Ltd, trade name: "TECHNOPOLYMER XX80AA", weight-average particle size: 5.5 μm, refractive index: 1.515) serving as the above fine particles, 0.1 weight parts of a leveling agent (produced by DIC Corporation, trade name: "GRANDIC PC-4100"), and 0.5 weight parts of a photopolymerization initiator (produced by Ciba Specialty Chemicals Inc., trade name: "IRGACURE 127") were mixed together. The resulting mixture was diluted to allow a ratio of butyl acetate/MEK and a solid concentration to become 2/1 (weight ratio) and 45 weight %, respectively, to prepare an antiglare hard coat layer forming material.

Then, as a translucent substrate, a transparent plastic film substrate (a triacetylcellulose film (produced by Fujifilm Corporation, trade name "FUJITAC", thickness: 40 μm, refractive index: 1.49) was used. The antiglare layer forming material (coating solution) was applied to one surface of the transparent plastic film substrate using a comma coater. Then, the transparent plastic film substrate formed with the coated film was conveyed to a drying process while being tilted by an angle of about 30 degrees. In the drying process, the substrate was heated at 90° C. for 2 minutes to dry the coated film. Subsequently, the substrate was irradiated with ultraviolet from a high-pressure mercury lamp by a cumulative light amount of 300 mJ/cm$^2$, to cure the coated film to thereby form a 9 μm-thick antiglare layer to obtain an antiglare-layer-coated protective layer having a Haze value of 12%.

<Antiglare-Layer-Coated Protective Layer Having Haze Value of 25%>

First of all, a hard coat layer forming material (produced by JSR Corporation, trade name: "OPSTAR Z7540", solids content: 56 weight %, solvent: butyl acetate/methyl ethyl ketone (MEK)=76/24 (weight ratio)) comprising aftermentioned components (A), and silica nanoparticles (aftermentioned component (B)) formed by coupling inorganic oxide particles and a polymerizable unsaturated group-containing organic compound together and dispersed therein was used. The hard coat layer forming material contains: components (A): dipentaerythritol and isophorone diisocyanate-based polyurethane; and a component (B): silica fine particles (weight-average particle size: 100 nm or less) whose surface is modified with an organic molecule, wherein a weight ratio of a total of the components (A) to the component (B) is 2:3. A refractive index of a hardened coat of the hard coat layer forming material was 1.485. With respect to 100 weight parts of the resin solid content in the hard coat layer forming material, 13 weight parts of acryl-styrene cross-linked particles (produced by Sekisui Chemical Co., Ltd, trade name: "TECHNOPOLYMER XX80AA", weight-average particle size: 5.5 μm, refractive index: 1.515) serving as the above fine particles, 0.1 weight parts of a leveling agent (produced by DIC Corporation, trade name: "GRANDIC PC-4100"), and 0.5 weight parts of a photopolymerization initiator (produced by Ciba Specialty Chemicals Inc., trade name: "IRGACURE 127") were mixed together. The resulting mixture was diluted to allow a ratio of butyl acetate/MEK and a solid concentration to become 2/1 (weight ratio) and 45 weight %, respectively, to prepare an antiglare hard coat layer forming material.

Then, as a translucent substrate, a transparent plastic film substrate (a triacetylcellulose film (produced by Fujifilm Corporation, trade name "FUJITAC", thickness: 40 μm, refractive index: 1.49) was used. The antiglare layer forming material (coating solution) was applied to one surface of the transparent plastic film substrate using a comma coater. Then, the transparent plastic film substrate formed with the coated film was conveyed to a drying process while being tilted by an angle of about 30 degrees. In the drying process, the substrate was heated at 90° C. for 2 minutes to dry the coated film. Subsequently, the substrate was irradiated with ultraviolet from a high-pressure mercury lamp by a cumulative light amount of 300 mJ/cm$^2$, to cure the coated film to thereby form a 9 μm-thick antiglare layer to obtain an antiglare-layer-coated protective layer having a Haze value of 25%.

TABLE 1

| | Production Process for Poralizing Film | Optical Properties | | Thickness of Polarizing Film | Reflectance of Polarizing Film (610 nm) | | | Aa× (Is/Ia) |
| | | Single Transmittance [%] | Polarization Degree [%] | | Absorption axis [%] | Transmission axis [%] | Refractive index in absorption axis direction | |
|---|---|---|---|---|---|---|---|---|
| Inventive Example 1-1 | Two-stage stretching | 42.33 | 99.975 | 3.7 | 5.59 | 4.50 | 1.62 | 0.81 |
| Inventive Example 1-2 | | 44.30 | 98.632 | 3.7 | 5.75 | 4.44 | 1.63 | 0.55 |
| Inventive Example 1-3 | | 42.08 | 99.990 | 4.7 | 5.56 | 4.51 | 1.62 | 0.70 |
| Inventive Example 1-4 | | 42.23 | 99.991 | 6.9 | 5.65 | 4.60 | 1.62 | 0.58 |
| Inventive Example 1-5 | | 42.33 | 99.975 | 3.7 | 5.59 | 4.50 | 1.62 | 0.81 |
| Inventive Example 1-6 | | 44.30 | 98.632 | 3.7 | 5.75 | 4.44 | 1.63 | 0.55 |
| Inventive Example 1-7 | | 44.30 | 98.632 | 3.7 | 5.75 | 4.44 | 1.63 | 0.55 |
| Inventive Example 1-8 | | 42.08 | 99.990 | 4.7 | 5.56 | 4.51 | 1.62 | 0.70 |
| Inventive Example 1-9 | | 42.23 | 99.991 | 6.9 | 5.65 | 4.60 | 1.62 | 0.58 |
| Inventive Example 1-10 | | 40.09 | 99.988 | 9.1 | 6.20 | 4.43 | 1.66 | 1.09 |
| Inventive Example 1-11 | | 40.09 | 99.988 | 9.1 | 6.20 | 4.43 | 1.66 | 1.09 |
| Inventive Example 1-12 | | 42.33 | 99.975 | 3.7 | 5.59 | 4.50 | 1.62 | 0.81 |
| Inventive Example 1-13 | | 43.00 | 99.984 | 4.8 | 5.60 | 4.50 | 1.62 | 0.74 |
| Inventive Example 1-14 | | 43.43 | 99.900 | 3.7 | 5.54 | 4.60 | 1.62 | 0.71 |
| Inventive Example 1-15 | | 41.42 | 99.986 | 3.7 | 5.56 | 4.54 | 1.62 | 0.82 |
| Inventive Example 1-16 | | 40.54 | 99.998 | 4.8 | 6.42 | 4.40 | 1.68 | 0.98 |
| Inventive Example 1-17 | Dry stretching | 39.69 | 99.975 | 5.6 | 6.05 | 4.70 | 1.65 | 1.05 |
| Inventive Example 1-18 | Excessive dyeing/partial | 41.52 | 99.993 | 3.8 | 6.35 | 4.38 | 1.67 | 1.10 |
| Inventive Example 1-19 | decolorizing (decolorization & cross-linking in common bath) | 42.95 | 99.900 | 3.8 | 6.32 | 4.40 | 1.67 | 1.01 |
| Inventive Example 1-20 | Excessive dyeing/partial | 41.66 | 99.985 | 3.8 | 6.03 | 4.50 | 1.65 | 0.98 |

TABLE 1-continued

| | | | | | | | | |
|---|---|---|---|---|---|---|---|---|
| Inventive Example 1-21 | decolorizing (decolorization & cross-linking in separate baths) | 42.66 | 99.968 | 3.8 | 6.36 | 4.50 | 1.67 | 0.90 |
| Inventive Example 1-22 | | 42.12 | 99.985 | 3.8 | 6.43 | 4.50 | 1.68 | 0.98 |
| Comparative Example 1-1 | Two-stage stretching | 42.33 | 99.975 | 3.7 | 5.59 | 4.50 | 1.62 | 0.81 |
| Comparative Example 1-2 | | 44.30 | 98.632 | 3.7 | 5.75 | 4.44 | 1.63 | 0.55 |
| Comparative Example 1-3 | | 42.08 | 99.990 | 4.7 | 5.56 | 4.51 | 1.62 | 0.70 |
| Comparative Example 1-4 | | 42.23 | 99.991 | 6.9 | 5.65 | 4.60 | 1.62 | 0.58 |
| Comparative Example 1-5 | | 40.09 | 99.988 | 9.1 | 6.20 | 4.43 | 1.66 | 1.09 |
| Comparative Example 1-6 | | 40.09 | 99.988 | 9.1 | 6.20 | 4.43 | 1.66 | 1.09 |
| Comparative Example 1-7 | | 42.33 | 99.975 | 3.7 | 5.59 | 4.50 | 1.62 | 0.81 |
| Comparative Example 1-8 | | 43.00 | 99.984 | 4.8 | 5.60 | 4.50 | 1.62 | 0.74 |
| Comparative Example 1-9 | | 43.43 | 99.900 | 3.7 | 5.54 | 4.60 | 1.62 | 0.71 |
| Comparative Example 1-10 | | 41.42 | 99.986 | 3.7 | 5.56 | 4.54 | 1.62 | 0.82 |
| Comparative Example 1-11 | | 40.54 | 99.998 | 4.8 | 6.42 | 4.40 | 1.68 | 0.98 |
| Comparative Example 1-12 | Dry stretching | 39.69 | 99.975 | 5.6 | 6.05 | 4.70 | 1.65 | 1.05 |
| Comparative Example 1-13 | Excessive dyeing/partial decolorizing (decolorization & cross-linking in common bath) | 41.52 | 99.993 | 3.8 | 6.35 | 4.38 | 1.67 | 1.10 |
| Comparative Example 1-14 | | 42.95 | 99.900 | 3.8 | 6.32 | 4.40 | 1.67 | 1.01 |
| Comparative Example 1-15 | Excessive dyeing/partial decolorizing (decolorization & cross-linking in separate baths) | 41.66 | 99.985 | 3.8 | 6.03 | 4.50 | 1.65 | 0.98 |
| Comparative Example 1-16 | | 42.66 | 99.968 | 3.8 | 6.36 | 4.50 | 1.67 | 0.90 |
| Comparative Example 1-17 | | 42.12 | 99.985 | 3.8 | 6.43 | 4.50 | 1.68 | 0.98 |
| Conventional Example 1 | Single-layer stretching | 43.29 | 99.994 | 17 | 5.13 | 4.41 | 1.59 | 0.40 |
| Conventional Example 2 | | 44.63 | 99.685 | 17 | 5.08 | 4.45 | 1.58 | 0.25 |
| Conventional Example 3 | | 43.52 | 99.988 | 25 | 4.95 | 4.50 | 1.57 | 0.21 |

| | Matrial of Optical Film | Thickness of Optical Film | Refractive Index of Adhesive | Refractive Index of Optical Film | Difference in Diffractive Index (Polarizing Film-Adhesive Layer) | Difference in Diffractive Index (Adhesive Layer-Optical Film) | Evaluation on Unevenness |
|---|---|---|---|---|---|---|---|
| Inventive Example 1-1 | acrylic | 40 | 1.59 | 1.50 | 0.03 | 0.09 | Invisible |
| Inventive Example 1-2 | acrylic | 40 | 1.59 | 1.50 | 0.04 | 0.09 | Invisible |
| Inventive Example 1-3 | acrylic | 40 | 1.59 | 1.50 | 0.03 | 0.09 | Invisible |
| Inventive Example 1-4 | acrylic | 40 | 1.59 | 1.50 | 0.03 | 0.09 | Invisible |
| Inventive Example 1-5 | acrylic | 40 | 1.56 | 1.50 | 0.06 | 0.06 | Invisible |
| Inventive Example 1-6 | acrylic | 40 | 1.56 | 1.50 | 0.07 | 0.06 | Faintly visible |
| Inventive Example 1-7 | acrylic | 40 | 1.55 | 1.50 | 0.08 | 0.05 | Slightly visible |
| Inventive Example 1-8 | acrylic | 40 | 1.56 | 1.50 | 0.06 | 0.06 | Invisible |
| Inventive Example 1-9 | acrylic | 40 | 1.56 | 1.50 | 0.06 | 0.06 | Invisible |
| Inventive Example 1-10 | acrylic | 40 | 1.60 | 1.50 | 0.06 | 0.10 | Invisible |
| Inventive Example 1-11 | acrylic | 40 | 1.59 | 1.50 | 0.07 | 0.09 | Faintly visible |
| Inventive Example 1-12 | TAC | 40 | 1.56 | 1.49 | 0.06 | 0.07 | Invisible |
| Inventive Example 1-13 | acrylic | 40 | 1.56 | 1.50 | 0.06 | 0.06 | Invisible |

TABLE 1-continued

| | | | | | | | |
|---|---|---|---|---|---|---|---|
| Inventive Example 1-14 | acrylic | 40 | 1.56 | 1.50 | 0.06 | 0.06 | Invisible |
| Inventive Example 1-15 | acrylic | 40 | 1.56 | 1.50 | 0.06 | 0.06 | Invisible |
| Inventive Example 1-16 | acrylic | 40 | 1.60 | 1.50 | 0.08 | 0.10 | Slightly visible |
| Inventive Example 1-17 | acrylic | 40 | 1.59 | 1.50 | 0.06 | 0.09 | Invisible |
| Inventive Example 1-18 | acrylic | 40 | 1.60 | 1.50 | 0.07 | 0.10 | Faintly visible |
| Inventive Example 1-19 | acrylic | 40 | 1.60 | 1.50 | 0.07 | 0.10 | Faintly visible |
| Inventive Example 1-20 | acrylic | 40 | 1.59 | 1.50 | 0.06 | 0.09 | Invisible |
| Inventive Example 1-21 | acrylic | 40 | 1.60 | 1.50 | 0.07 | 0.10 | Faintly visible |
| Inventive Example 1-22 | acrylic | 40 | 1.60 | 1.50 | 0.08 | 0.10 | Slightly visible |
| Comparative Example 1-1 | acrylic | 40 | 1.53 | 1.50 | 0.09 | 0.03 | Visible |
| Comparative Example 1-2 | acrylic | 40 | 1.53 | 1.50 | 0.10 | 0.03 | Significantly visible |
| Comparative Example 1-3 | acrylic | 40 | 1.53 | 1.50 | 0.09 | 0.03 | Visible |
| Comparative Example 1-4 | acrylic | 40 | 1.53 | 1.50 | 0.09 | 0.03 | Visible |
| Comparative Example 1-5 | acrylic | 40 | 1.53 | 1.50 | 0.13 | 0.03 | Significantly-visible |
| Comparative Example 1-6 | acrylic | 40 | 1.62 | 1.50 | 0.04 | 0.12 | Significantly visible |
| Comparative Example 1-7 | TAC | 40 | 1.53 | 1.49 | 0.09 | 0.04 | Visible |
| Comparative Example 1-8 | acrylic | 40 | 1.53 | 1.50 | 0.09 | 0.03 | Visible |
| Comparative Example 1-9 | acrylic | 40 | 1.53 | 1.50 | 0.09 | 0.03 | Visible |
| Comparative Example 1-10 | acrylic | 40 | 1.53 | 1.50 | 0.09 | 0.03 | Visible |
| Comparative Example 1-11 | acrylic | 40 | 1.53 | 1.50 | 0.15 | 0.03 | Significantly visible |
| Comparative Example 1-12 | acrylic | 40 | 1.53 | 1.50 | 0.12 | 0.03 | Significantly visible |
| Comparative Example 1-13 | acrylic | 40 | 1.53 | 1.50 | 0.14 | 0.03 | Significantly visible |
| Comparative Example 1-14 | acrylic | 40 | 1.53 | 1.50 | 0.14 | 0.03 | Significantly visible |
| Comparative Example 1-15 | acrylic | 40 | 1.53 | 1.50 | 0.12 | 0.03 | Significantly visible |
| Comparative Example 1-16 | acrylic | 40 | 1.53 | 1.50 | 0.14 | 0.03 | Significantly visible |
| Comparative Example 1-17 | acrylic | 40 | 1.53 | 1.50 | 0.15 | 0.03 | Significantly visible |
| Conventional Example 1 | acrylic | 40 | 1.53 | 1.50 | 0.06 | 0.03 | Invisible |
| Conventional Example 2 | acrylic | 40 | 1.53 | 1.50 | 0.05 | 0.03 | Invisible |
| Conventional Example 3 | acrylic | 40 | 1.53 | 1.50 | 0.04 | 0.03 | Invisible |

TABLE 2

| | Production Process for Poralizing Film | Optical Properties | | Thickness of Polarizing Film | Reflectance of Polarizing Film (610 nm) | | Refractive index in absorption axis direction | Aax (Is/Ia) |
|---|---|---|---|---|---|---|---|---|
| | | Single Transmittance [%] | Polarization Degree [%] | | Absorption axis | Transmission axis [%] | | |
| Inventive Examole 2-1 | Two-stage stretching | 42.33 | 99.975 | 3.7 | 5.59 | 4.50 | 1.62 | 0.81 |
| Inventive Examole 2-2 | | 42.08 | 99.990 | 4.7 | 5.56 | 4.51 | 1.62 | 0.70 |
| Inventive Examole 2-3 | | 42.23 | 99.991 | 6.9 | 5.65 | 4.60 | 1.62 | 0.58 |
| Inventive Examole 2-4 | | 40.09 | 99.988 | 9.1 | 6.20 | 4.43 | 1.66 | 1.09 |
| Inventive Examole 2-5 | | 42.33 | 99.975 | 3.7 | 5.59 | 4.50 | 1.62 | 0.81 |

TABLE 2-continued

| | | | | | | | | |
|---|---|---|---|---|---|---|---|---|
| Inventive Examole 2-6 | | 42.08 | 99.990 | 4.7 | 5.56 | 4.51 | 1.62 | 0.70 |
| Inventive Examole 2-7 | | 42.23 | 99.991 | 6.9 | 5.65 | 4.60 | 1.62 | 0.58 |
| Inventive Examole 2-8 | | 40.09 | 99.988 | 9.1 | 6.20 | 4.43 | 1.66 | 1.09 |
| Inventive Examole 2-9 | | 42.08 | 99.990 | 4.7 | 5.56 | 4.51 | 1.62 | 0.70 |
| Inventive Examole 2-10 | | 42.08 | 99.990 | 4.7 | 5.56 | 4.51 | 1.62 | 0.70 |
| Inventive Examole 2-11 | | 42.08 | 99.990 | 4.7 | 5.56 | 4.51 | 1.62 | 0.70 |
| Inventive Examole 2-12 | Excessive dyeing/partial decolorizing (decolorization & cross-linking in common bath) | 41.52 | 99.993 | 3.8 | 6.35 | 4.38 | 1.67 | 1.10 |
| Inventive Examole 2-13 | Excessive dyeing/partial decolorizing (decolorization & cross-linking in separate baths) | 41.66 | 99.985 | 3.8 | 6.03 | 4.50 | 1.65 | 0.98 |
| Comparative Example 2-1 | Two-stage stretching | 42.33 | 99.975 | 3.7 | 5.59 | 4.50 | 1.62 | 0.81 |
| Comparative Example 2-2 | | 42.08 | 99.990 | 4.7 | 5.56 | 4.51 | 1.62 | 0.70 |
| Comparative Example 2-3 | | 42.23 | 99.991 | 6.9 | 5.65 | 4.60 | 1.62 | 0.58 |
| Comparative Example 2-4 | | 40.09 | 99.988 | 9.1 | 6.20 | 4.43 | 1.66 | 1.09 |
| Comparative Example 2-5 | Excessive dyeing/partial decolorizing (decolorization & cross-linking in common bath) | 41.52 | 99.993 | 3.8 | 6.35 | 4.38 | 1.67 | 1.10 |
| Comparative Example 2-6 | Excessive dyeing/partial decolorizing (decolorization & cross-linking in separate baths) | 41.66 | 99.985 | 3.8 | 6.03 | 4.50 | 1.65 | 0.98 |

| | Refractive Index of Adhesive | Refractive Index of Optical Film | Difference in Diffractive Index (Polarizing Film-Adhesive Layer) | Difference in Diffractive Index (Adhesive Layer-Optical Film) | Thickness of Sub-Laminate [μm] | Evaluation on Unevenness |
|---|---|---|---|---|---|---|
| Inventive Examole 2-1 | 1.53 | 1.49 | 0.09 | 0.04 | 60 | Faintly visible |
| Inventive Examole 2-2 | 1.53 | 1.49 | 0.09 | 0.04 | 60 | Faintly visible |
| Inventive Examole 2-3 | 1.53 | 1.49 | 0.09 | 0.04 | 60 | Faintly visible |
| Inventive Examole 2-4 | 1.53 | 1.49 | 0.13 | 0.04 | 60 | Faintly visible |
| Inventive Examole 2-5 | 1.53 | 1.49 | 0.09 | 0.04 | 80 | Invisible |
| Inventive Examole 2-6 | 1.53 | 1.49 | 0.09 | 0.04 | 80 | Invisible |
| Inventive Examole 2-7 | 1.53 | 1.49 | 0.09 | 0.04 | 80 | Invisible |
| Inventive Examole 2-8 | 1.53 | 1.49 | 0.13 | 0.04 | 80 | Invisible |
| Inventive Examole 2-9 | 1.53 | 1.49 | 0.09 | 0.04 | 112 | Invisible |
| Inventive Examole 2-10 | 1.53 | 1.49 | 0.09 | 0.04 | 1140 | Invisible |
| Inventive Examole 2-11 | 1.53 | 1.49 | 0.09 | 0.04 | 1140 | Invisible |
| Inventive Examole 2-12 | 1.53 | 1.49 | 0.14 | 0.04 | 60 | Faintly visible |
| Inventive Examole 2-13 | 1.53 | 1.49 | 0.12 | 0.04 | 60 | Faintly visible |
| Comparative Example 2-1 | 1.53 | 1.49 | 0.09 | 0.04 | 40 | Visible |

TABLE 2-continued

| | | | | | | |
|---|---|---|---|---|---|---|
| Comparative Example 2-2 | 1.53 | 1.49 | 0.09 | 0.04 | 40 | Visible |
| Comparative Example 2-3 | 1.53 | 1.49 | 0.09 | 0.04 | 40 | Visible |
| Comparative Example 2-4 | 1.53 | 1.49 | 0.13 | 0.04 | 40 | Significantly visible |
| Comparative Example 2-5 | 1.53 | 1.49 | 0.14 | 0.04 | 40 | Significantly visible |
| Comparative Example 2-6 | 1.53 | 1.49 | 0.12 | 0.04 | 40 | Significantly visible |

TABLE 3

| | Production process for Polarizing Film | Optical Properties | | Thickness of Polarizing Film | Reflectance of Polarizing Film (610 nm) | | | Aa× (Is/Ia) |
|---|---|---|---|---|---|---|---|---|
| | | Single Transmittance [%] | Polarization Degree [%] | | Absorption axis [%] | Transmission axis [%] | Refractive index in absorption axis direction | |
| Inventive Example 3-1 | Two-stage stretching | 42.33 | 99.975 | 3.7 | 5.59 | 4.50 | 1.62 | 0.81 |
| Inventive Example 3-2 | | 42.08 | 99.990 | 4.7 | 5.56 | 4.51 | 1.62 | 0.70 |
| Inventive Example 3-3 | | 42.23 | 99.991 | 6.9 | 5.65 | 4.60 | 1.62 | 0.58 |
| Inventive Example 3-4 | | 40.09 | 99.988 | 9.1 | 6.20 | 4.43 | 1.66 | 1.09 |
| Inventive Example 3-5 | | 42.33 | 99.975 | 3.7 | 5.59 | 4.50 | 1.62 | 0.81 |
| Inventive Example 3-6 | | 42.08 | 99.990 | 4.7 | 5.56 | 4.51 | 1.62 | 0.70 |
| Inventive Example 3-7 | | 42.23 | 99.991 | 6.9 | 5.65 | 4.60 | 1.62 | 0.58 |
| Inventive Example 3-8 | | 40.09 | 99.988 | 9.1 | 6.20 | 4.43 | 1.66 | 1.09 |
| Inventive Example 3-9 | | 42.08 | 99.990 | 4.7 | 5.56 | 4.51 | 1.62 | 0.70 |
| Inventive Example 3-10 | | 42.08 | 99.990 | 4.7 | 5.56 | 4.51 | 1.62 | 0.70 |
| Inventive Example 3-11 | Excessive dyeing/partial decolorizing (decolorization & cross-linking in common bath) | 41.52 | 99.993 | 3.8 | 6.35 | 4.38 | 1.67 | 1.10 |
| Inventive Example 3-12 | Excessive Dyeing/partial decolorizing (decolorization & cross-linking in separate baths) | 41.66 | 99.985 | 3.8 | 6.03 | 4.50 | 1.65 | 0.98 |
| Comparative Example 3-1 | Two-stage stretching | 42.33 | 99.975 | 3.7 | 5.59 | 4.50 | 1.62 | 0.81 |
| Comparative Example 3-2 | | 42.08 | 99.990 | 4.7 | 5.56 | 4.51 | 1.62 | 0.70 |
| Comparative Example 3-3 | | 42.23 | 99.991 | 6.9 | 5.65 | 4.60 | 1.62 | 0.58 |
| Comparative Example 3-4 | | 40.09 | 99.988 | 9.1 | 6.20 | 4.43 | 1.66 | 1.09 |
| Comparative Example 3-5 | Excessive dyeing/partial decolorizing (decolorization & cross-linking in common bath) | 41.52 | 99.993 | 3.8 | 6.35 | 4.38 | 1.67 | 1.10 |
| Comparative Example 3-6 | Excessive dyeing/partial decolorizing (decolorization & cross-linking in separate baths) | 41.66 | 99.985 | 3.8 | 6.03 | 4.50 | 1.65 | 0.98 |

TABLE 3-continued

|  | Refractive Index of Adhesive | Refractive Index of Optical Film | Difference in Diffractive Index (Polarizing Film-Adhesive Layer) | Difference in Diffractive Index (Adhesive Layer-Optical Film) | Thickness of Optical Film [μm] | Antiglare Layer | Haze Of Sub-Laminate [%] | Evaluation On Unevenness |
|---|---|---|---|---|---|---|---|---|
| Inventive Example 3-1 | 1.53 | 1.49 | 0.09 | 0.04 | 40 | with | 0.5 | Slightly visible |
| Inventive Example 3-2 | 1.53 | 1.49 | 0.09 | 0.04 | 40 | with | 0.5 | Slightly visible |
| Inventive Example 3-3 | 1.53 | 1.49 | 0.09 | 0.04 | 40 | with | 0.5 | Slightly visible |
| Inventive Example 3-4 | 1.53 | 1.49 | 0.13 | 0.04 | 40 | with | 0.5 | Slightly visible |
| Inventive Example 3-5 | 1.53 | 1.49 | 0.09 | 0.04 | 40 | with | 1.5 | Faintly visible |
| Inventive Example 3-6 | 1.53 | 1.49 | 0.09 | 0.04 | 40 | with | 1.5 | Faintly visible |
| Inventive Example 3-7 | 1.53 | 1.49 | 0.09 | 0.04 | 40 | with | 1.5 | Faintly visible |
| Inventive Example 3-8 | 1.53 | 1.49 | 0.13 | 0.04 | 40 | with | 1.5 | Faintly visible |
| Inventive Example 3-9 | 1.53 | 1.49 | 0.09 | 0.04 | 40 | with | 12 | Invisible |
| Inventive Example 3-10 | 1.53 | 1.49 | 0.09 | 0.04 | 40 | with | 25 | Invisible |
| Inventive Example 3-11 | 1.53 | 1.49 | 0.14 | 0.04 | 40 | with | 1.5 | Faintly visible |
| Inventive Example 3-12 | 1.53 | 1.49 | 0.12 | 0.04 | 40 | with | 1.5 | Faintly visible |
| Comparative Example 3-1 | 1.53 | 1.49 | 0.09 | 0.04 | 40 | without | 0.3 | Visible |
| Comparative Example 3-2 | 1.53 | 1.49 | 0.09 | 0.04 | 40 | without | 0.3 | Visible |
| Comparative Example 3-3 | 1.53 | 1.49 | 0.09 | 0.04 | 40 | without | 0.3 | Visible |
| Comparative Example 3-4 | 1.53 | 1.49 | 0.13 | 0.04 | 40 | without | 0.3 | Significantly visible |
| Comparative Example 3-5 | 1.53 | 1.49 | 0.14 | 0.04 | 40 | without | 0.3 | Significantly visible |
| Comparative Example 3-6 | 1.53 | 1.49 | 0.12 | 0.04 | 40 | without | 0.3 | Significantly visible |

[Evaluations]

(Measurement of Thickness)

For each of the Inventive Examples and the Comparative Examples, a thickness of the polarizing film was measured by optical microscopic observation of a cut surface of the optical laminate, together with Raman spectrometry using an after-mentioned laser Raman microscope. For the Conventional Examples 1 to 3, a thickness of the polarizing film was measured by a digital gage (PEACOCK DG205 produced by OZAKI MFG. Co., Ltd.).

(Measurement of Reflectance of Polarizing Film)

In an optical film laminate (laminate of a stretched substrate and a polarizing film) obtained in the course of the production process in each of the Inventive Examples and the Comparative Examples, a surface (i.e., PET side surface) of the optical film laminate on a side opposite to the polarizing film was uniformly roughened by a sand paper, and then coated and colored with a black paint to reduce a visible light transmittance to 5% or less.

As for a polarizing film obtained by the production process in each of the Conventional Examples 1 to 3, an amorphous PET substrate peeled from an optical film laminate obtained in the course of the production process in each of the Inventive Examples was laminated on one surface of the polarizing film, and a surface of the amorphous PET on a side opposite to the polarizing film was uniformly roughened by a sand paper and then coated and colored with a black paint to reduce a visible light transmittance to 5% or less.

Then, polarized light is entered into a measurement surface, i.e., the polarizing film at an incidence angle of 10 degree, and a reflectance at 610 nm in wavelength in each of a transmission axis and an absorption axis of the polarizing film was measured by using a spectrophotometer (produced by Hitachi High-Technologies Corporation, trade name: "U-4100").

(Derivation of Refractive Index of Polarizing Film)

On the assumption that a refractive index of air is 1, a refractive index (converted refractive index) of the polarizing film was derived from measurement values of a transmission axis-directional reflectance Rt and an absorption axis-directional reflectance Ra using the following relational formulas: $Rt=((1-nt)/(1+nt))^2$, $Ra=((1-na)/(1+na))^2$, where nt represents a transmission axis-directional refractive index of the polarizing film, and na represents an absorption axis-directional refractive index of the polarizing film.

(Measurement of Transmittance and Degree of Polarization)

An 80 μm-thick saponified triacetyl cellulose (TAC) film (produced by Fujifilm Corporation, trade name: "FUJITAC TD80UL") was laminated to an optical film laminate (laminate of a stretched substrate and a polarizing film) obtained in the course of the production process in each of the Inventive Examples and the Comparative Examples, while applying an adhesive prepared in the above manner to have a refractive index of 1.53, onto the surface of the polarizing film to allow a thickness of an adhesive layer after drying to become 80 nm, and then subjected to drying at 50° C. for 5 minutes. Then, the amorphous PET substrate was peeled, while allowing the polarizing film to be transferred to the 80 μm-thick TAC film serving as a protective layer, to prepare a laminate. The laminate was subjected to measurement of a single layer transmittance T, a parallel transmittance Tp and a crossed transmittance Tc of the polarizing film, using an ultraviolet-visible spectrometer (V7100 produced by JASCO Corporation). Each of the values T, Tp and Tc is a Y value obtained by performing measurement based on a two-degree view field (C light source) in accordance with the JIS Z 8701 and visibility correction.

A degree of polarization P was calculated by the following formula, using the above transmittance: Degree of polarization P (%)={(Tp−Tc)/(Tp+Tc)}$^{1/2}$×100

(Calculation of Absorbance)

A transmittance ka in a state in which polarized light is entered into the polarizing film in a direction parallel to an absorption axis thereof was calculated by the following formula, using the measured values of the parallel transmittance Tp and the crossed transmittance Tc obtained by the above measurement of transmittance and degree of polarization, and then an absorbance (in the state in which polarized light is entered into the polarizing film in a direction parallel to the absorption axis thereof) Aa was calculated from ka.

$$ka=(\tfrac{1}{2})^{1/2}(Tp+Tc)^{1/2}/(Tp-Tc)^{1/2}$$

$$Aa=-\log_{10}(ka)$$

In this calculation, each of the values Tp and Tc measured in the measurement wavelength range of 380 to 780 nm was directly used, instead of a Y value after visibility correction.

(Raman Spectrometry)

Figure 7:
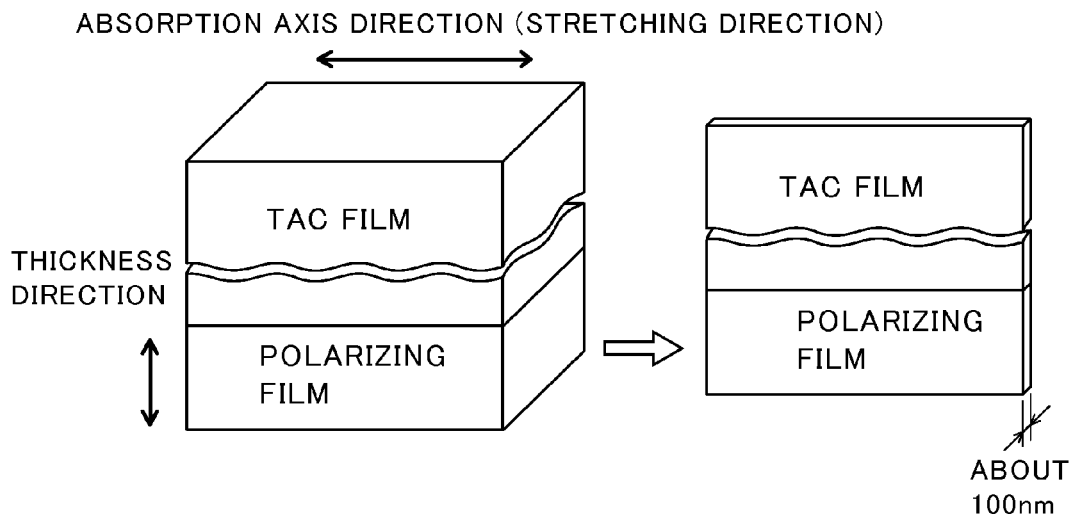
FIG. 7 is a diagram illustrating a method of preparing a sample for Raman spectrometry.

As illustrated in FIG. 7, a central portion of the laminate (a laminate obtained by laminating a TAC film to an optical film laminate and then peeling a PET substrate from the optical film laminate) was cut along the absorption axis direction (stretching direction) of the polarizing film and a thickness direction of the polarizing film, by using an ultramicrotome (produced by LEICA, trade name: "LEICA ULTRACUT UCT" or "LEICA EM UC7") to prepare an ultra-thin slice sample having a length of about 100 nm in a direction perpendicular to the absorption axis direction of the polarizing film and the thickness direction of the polarizing film.

Figure 8:
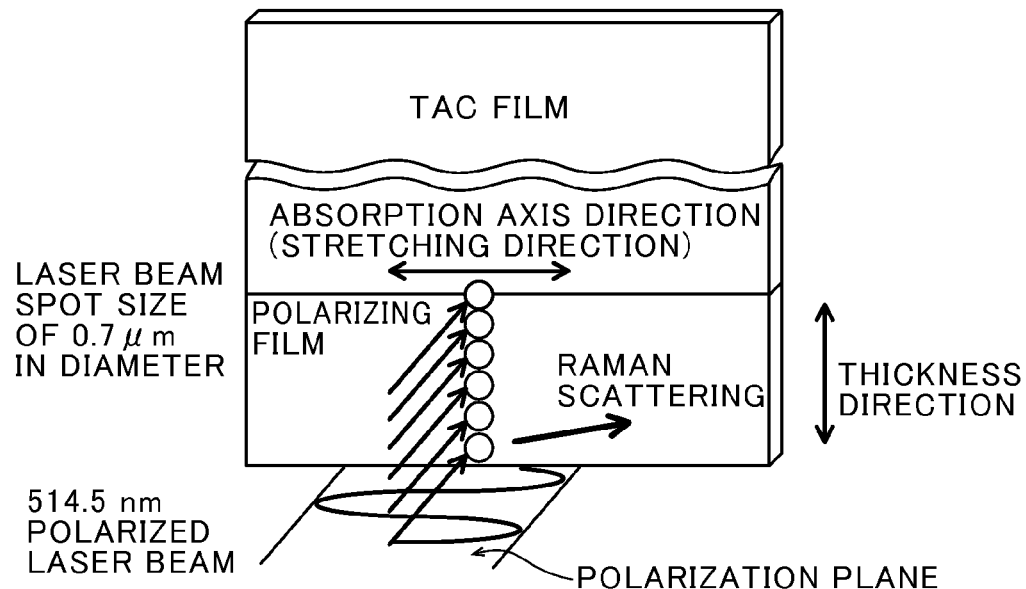
FIG. 8 is an explanatory diagram illustrating Raman spectrometry.

An apparatus used for Raman spectrometry and measurement conditions were as follows:

Apparatus: laser Raman microscope
  LabRAM HR800 produced by Jobin Yvon S. A. S.
  (HR800 produced by HORIBA Jobin Yvon)
Excitation wavelength: 514.5 nm
Grating: 1800 gr/nm
Objective lens: ×100 (numerical aperture: 0.9)
Measurement pitch: 0.1 μm As illustrated in FIG. 8, regarding the cut surface of the polarizing film in the above ultra-thin slice sample, Raman spectrum measurement was performed at measurement points arranged in the thickness direction of the polarizing film at intervals of 0.1 μm.

A laser beam was entered into the cut surface of the polarizing film in the ultra-thin slice sample, in such a manner that a polarization plane thereof is oriented in a direction parallel to the absorption axis direction (stretching direction) of the polarizing film and perpendicular to the cut surface. Further, an analyzer was installed behind the ultra-thin slice sample. A polarization plane of the analyzer was set to be parallel to the polarization plane of the laser beam.

Because of the above measurement conditions, a resolution, i.e., a spot size (half-value width) of the laser beam on the sample is 0.7 μm. When a center of a cross-sectional spot of the laser beam is located at a position away from a surface of the polarizing film by 0.5 μm, this position approximately corresponds to a position of a center of a length of 1 μm from the surface of the polarizing film, and an error due to Raman scattering from air and $I_3^-$ ions which exist in a region other than a region ranging from the surface of the polarizing film to 1 μm inward in the thickness direction of the polarizing film is small. Thus, it was possible to adequately approximate Is.

In any of Raman spectra of the Inventive Examples, the Comparative Examples and the Conventional Examples, a peak corresponding to $I_3^-$ was observed around 108 cm$^{-1}$, and a peak corresponding to $I_5^-$ was observed around 158 cm$^{-1}$, as illustrated in FIG. 2.

(Calculation of Integrated Intensity Distribution of $I_3^-$)

Regarding a Raman spectrum obtained at each of the measurement points, an integrated intensity in a wavenumber interval of 90 cm$^{-1}$ to 120 cm$^{-1}$ was determined by performing the baseline correction.

The baseline collection was performed by approximating a baseline of a Raman spectrum as a straight line with a straight line connecting two points which indicate, respectively, a Raman intensity at a wavenumber of 90 cm$^{-1}$ and a Raman intensity at a wavenumber of 120 cm$^{-1}$ in a wavenumber interval of 90 cm$^{-1}$ to 120 cm$^{-1}$, and determining a distance from the approximated straight-line, as a Raman intensity, to thereby correct an inclination of a baseline at the time of measurement (see FIG. 2). An integrated intensity distribution in the thickness direction of the polarizing film was determined from the integrated intensities at each of the measurement points (FIGS. 3(a) and 3(b)). In the figures, the origin point in the thickness direction corresponds to a position of the inflection point, wherein suppose that light enters from the side of negative coordinates.

(Calculation of Aa×(Is/Ia))

In the integrated intensity distribution graph in the thickness direction of the polarizing film in FIG. 3, the value Ia obtained by integrating the distribution of integrated intensities over the entire interval in the thickness direction of the polarizing film was calculated. Specifically, on the assumption that an integrated intensity at a thickness directional position x before being subjected to the smoothing processing express is expressed as I(x), an integrated intensity $I_{WMA}(x)$ after being subjected to the smoothing processing was calculated by using the following formula: $I_{WMA}$=[I(x−0.5)×1+I(x−0.4)×2+I(x−0.3)×4+I(x−0.2)×6+I(x−0.1)×8+I(x)×10+I(x+0.1)×8+I(x+0.2)×6+I(x+0.3)×4+I(x+0.4)×2+I(x+0.5)×1]/(1+2+4+6+8+10+8+6+4+2+1). Then, the value of Is is calculated by integrating the $I_{WMA}(x)$ over an entire interval.

Examples of an integrated intensity distribution obtained after the smoothing processing are illustrated in FIGS. 3(a) and 3(b).

Then, Is, i.e., a value obtained by integrating, over the entire interval in the thickness direction of the polarizing film, a distribution of integrated intensities in the thickness direction of the polarizing film, wherein each of the integrated intensities is obtained by integrating, in a wavenumber interval of 90 cm$^{-1}$ to 120 cm$^{-1}$, Raman scattering of $I_3^-$ ions which exist in the region of the polarizing film ranging from the first surface to 1 μm depth in the thickness direction thereof and are oriented in the absorption axis direction of the polarizing film, was approximately calculated.

Specifically, first, in an integrated intensity distribution obtained through the smoothing processing in the above manner during calculation of Ia, a position of an inflection point in a rise region of a light entrance side was identified by determining a maximum value of differential of the integrated intensity distribution.

Then, a value of the integrated intensity $I_{WMA}$ (0.5) at the position away from the identified inflection point by +0.5 μm was determined, and used as a value of Is.

As described above, as a value of Aa×(Is/Ia), a value of Aa×($I_{WMA}$ (0.5)/Ia) was calculated based on the obtained values of Aa, Ia and $I_{WMA}$ (0.5).

(Measurement of Refractive Index of Adhesive Layer)

Each of the adhesives obtained in the above manner was applied to a PET substrate, and dried at 100° C. to obtain a single-layer film. A refractive index of each of the adhesives was measured using an Abbe refractometer (produced by Atago Co. Ltd., trade name: "DR-M") and a sodium light source (D line, wavelength: 589 nm).

(Measurement of Refractive Indexes of (Meta) Acrylic-Based Resin Film and Easy-Adhesion Layer)

With regard to a refractive index of the (meta) acrylic-based resin film, the 40 μm-thick (meta) acrylic-based resin film produced without coating of an easy-adhesion layer, i.e., obtained only through melt extrusion of an (meta) acrylic-based resin and drying, in the production process for a (meta) acrylic-based resin film with an easy-adhesion layer was used and measured using an Abbe refractometer (produced by Atago Co. Ltd., trade name: "DR-M") and a sodium light source (D line, wavelength: 589 nm) and a sodium light source (D line, wavelength: 589 nm).

On the other hand, with regard to a refractive index of an easy-adhesion layer provided on a (meta) acrylic-based resin film, a single-layer film was obtained in the same manner as that in the measurement of the refractive index of the above adhesive layer, and then a refractive index of the single-layer film was measured using an Abbe refractometer (produced by Atago Co. Ltd., trade name: "DR-M") and a sodium light source (D line, wavelength: 589 nm).

(Measurement of Haze Value of Antiglare-Layer-Coated Protective Layer)

A haze value of each of the antiglare-layer-coated protective layers used in the Inventive Examples 3-1 to 3-12 and Comparative Examples 3-1 to 3-6 was measured using a haze meter "HM-150" (produced by Murakami Color Research Laboratory Co., Ltd.) in accordance with Haze (turbidity) in JIS K7136 (2000). In this evaluation, no difference in Haze value was observed depending on whether or not an adhesive layer having a refractive index of 1.53 is applied to the antiglare-layer-coated protective layer. Thus, the measured Haze value can be deemed to be a Haze value of the sub-laminate consisting of the adhesive layer and the antiglare-layer-coated protective layer.

(Evaluation Method for Interference Unevenness)

Regarding each of the optical laminates prepared in the Inventive Examples, the Comparative Examples and the Conventional Examples, a surface of the polarizing film was roughened, and then coated and colored with a black paint, specifically, a surface of the polarizing film on a side opposite to the protective layer was roughened and colored with a black paint, so as to reduce a visible light transmittance to 5% or less, to prepare a sample. The sample was placed in a dark room at a position just below a three-band fluorescent lamp (produced by Panasonic Corporation, trade name: "National Palook Three-Band Neutral White (F. L 15EX-N 15W)") with a distance of about 10 to 30 cm, and interference unevenness was evaluated while changing an observing point, by the following five levels: significantly visible; visible; slightly visible, faintly visible; invisible. The easy-adhesion layer comprised in the (meta) acrylic-based resin film used in the optical laminate prepared in each of the Inventive Examples and the Comparative Examples has a refractive index equal to that of the (meta) acrylic-based resin film. Thus, it is considered that an influence of the easy-adhesion layer is ignorable in the evaluation on interference unevenness.

(Reflectance of Polarizing Film)

Figure 9:
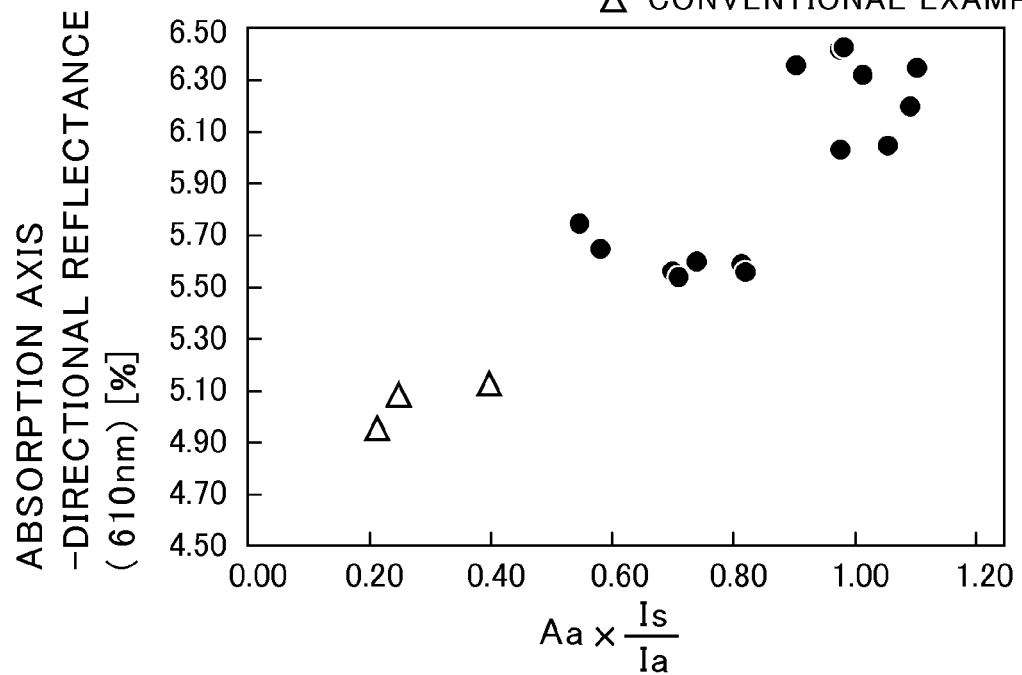
FIG. 9 is a graph presenting a relationship between a value of Aa×(Is/Ia) of a polarizing film, and a reflectance in an absorption direction at 610 nm which is on a longer-wavelength side of a visible wavelength range.

FIG. 9 presents a relationship between a value of Aa×(Is/Ia) of a polarizing film, and a reflectance in an absorption direction at 610 nm which is on a longer-wavelength side of a visible wavelength range. It was found that from FIG. 9 and Table 1 that the reflectance increases along with an increase in the value of Aa×(Is/Ia).

(Evaluation of Interference Unevenness)

The following points were found from Table 1. In the optical laminates in the Comparative Examples 1-1 to 1-5, 1-7 to 1-17, 2-1 to 2-6 and 3-1 to 3-6 each using the conventional adhesive having a refractive index of 1.53, the value of Aa× (Is/Ia) is 0.55 or more and interference unevenness is visually recognized. In the optical laminates in the Conventional Examples 1 to 3 each using the conventional adhesive having a refractive index of 1.53, the value of Aa×(Is/Ia) is 0.40 or less and no interference unevenness is visually recognized. Thus, it was found that, in any optical laminate using the conventional adhesive having a refractive index of 1.53, the problem of interference unevenness occurs when the value of Aa×(Is/Ia) is 0.53 or more.

Concerning this problem, in the optical laminates in the Comparative Examples 1-1 to 1-5 and 1-7 to 1-17 each using the conventional adhesive having a refractive index of 1.53, a difference between the absorption axis-directional refractive index of the polarizing film at a light entrance-side one of opposite surfaces of the polarizing film (in a region adjacent to the light entrance surface of the polarizing film) and the refractive index of the adhesive layer is 0.09 or more and interference unevenness is visually recognized. On the other hand, in the optical laminates in the Inventive Examples each using an adhesive having a refractive index greater than that of the conventional adhesive in order to reduce a difference between the absorption axis-directional refractive index at the light entrance surface of the polarizing film and the refractive index of the adhesive layer, when the difference between the absorption axis-directional refractive index at the light entrance surface of the polarizing film and the refractive index of the adhesive layer is 0.06 or less, no interference unevenness is visually recognized. Further, when the difference between the absorption axis-directional refractive index at the light entrance surface of the polarizing film and the refractive index of the adhesive layer is 0.07, only faint interference unevenness is visually recognized, and, when the difference between the absorption axis-directional refractive index at the light entrance surface of the polarizing film and the refractive index of the adhesive layer is 0.08, only slight interference unevenness is visually recognized. This proves that the optical laminates in the Inventive Examples can effectively suppress interference unevenness.

As to an influence of a difference in refractive index between an adhesive layer and an optical film which constitute an optical laminate, on interference unevenness, in the optical laminate in the Comparative Example 1-6, the difference in refractive index between the adhesive layer and the optical film is 0.12 and interference unevenness is visually recognized. On the other hand, in the optical laminates in the Inventive Examples 1-1 to 1-22 and the Conventional Examples 1 to 3, wherein the difference in refractive index between the adhesive layer and the optical film is 0.10 or less, only slightly or faint interference unevenness or no interference unevenness is visually recognized Therefore, the optical laminates in the Inventive Examples could effectively suppress interference unevenness.

The following points were found from Table 2. In the optical laminates in the Comparative Examples 2-1 to 2-6, the thickness of the sub-laminate is 40 μm and interference unevenness is visually recognized. On the other hand, in the optical laminates in the Inventive Examples 2-1 to 2-4, 2-12 and 2-13, wherein the thickness of the sub-laminate is increased to 60 μm in order to increase a difference in optical path length between light reflected by the polarizing film and light reflected by the viewing-side outermost surface of the optical laminate, only faint interference unevenness is visually recognized. Further, in the optical laminates in the Inventive Examples 2-5 to 2-11 wherein the thickness of the sub-laminate is 80 μm, no interference unevenness is visually recognized Therefore, the optical laminates in the Inventive Examples could effectively suppress interference unevenness.

The following points were found from Table 3. In the optical laminates in the Comparative Examples 3-1 to 3-6 provided with no antiglare layer, the Haze value is 0.3% and interference unevenness is visually recognized. On the other hand, in the optical laminates in the Inventive Examples 3-1 to 3-4 provided with an antiglare layer, wherein the Haze value is 0.5% or more, only slight interference unevenness is visually recognized. Further, in the optical laminates in the Inventive Examples 3-5 to 3-8, 3-11 and 3-12 provided with an antiglare layer, wherein the Haze value is 1.5% or more, only faint interference unevenness is visually recognized, and, in the optical laminates in the Inventive Examples 3-9 and 3-10 provided with an antiglare layer, wherein the Haze value is 12% or more, no interference unevenness is visually recognized.

While the present invention has been described by way of the specific embodiments, various changes and modifications may be made therein. Thus, the present invention is not limited to the specific embodiments and the scope of the present invention should be determined only by the appended claims and their legal equivalents.

What is claimed is:

1. An optical laminate in which a polarizing film comprised of a polyvinyl alcohol-based resin having oriented iodine is bonded on a first surface of the polarizing film to an optical film through an optically transparent adhesive layer, wherein:
    the polarizing film exhibits a property that a value expressed by the following formula: Aa×(Is/Ia), is 0.53 or more, where:
        Aa represents an absorbance in an absorption axis direction of the polarizing film at a wavelength of 480 nm;
        Ia represents a value obtained by integrating, over an entire interval in a thickness direction of the polarizing film, a distribution of integrated intensities in the thickness direction of the polarizing film, wherein each of the integrated intensities is obtained by integrating a Raman spectrum of the polarizing film in a wavenumber interval of 90 cm$^{-1}$ to 120 cm$^{-1}$; and
        Is represents a value obtained by integrating, over the entire interval in the thickness direction of the polarizing film, a distribution of integrated intensities in the thickness direction of the polarizing film, wherein each of the integrated intensities is obtained by integrating, in a wavenumber interval of 90 cm$^{-1}$ to 120 cm$^{-1}$, Raman scattering of $I_3^-$ ions which exist in a region of the polarizing film ranging from the first surface to 1 μm inward in the thickness direction thereof, and oriented in the absorption axis direction of the polarizing film; and
    the adhesive layer exhibits a property that a difference between a refractive index of the adhesive layer and a refractive index in the absorption axis direction of the polarizing film at the first surface of the polarizing film is 0.08 or less.

2. The optical laminate as defined in claim 1, wherein the difference between the refractive index in the absorption axis direction of the polarizing film at the first surface thereof and the refractive index of the adhesive layer is 0.06 or less.

3. The optical laminate as defined in claim 1, wherein the difference between the refractive index of the optical film and the refractive index of the adhesive layer is 0.10 or less.

4. The optical laminate as defined in claim 1, wherein the adhesive layer is formed using a solution containing a polyvinyl alcohol-based resin, a cross-linking agent and a colloidal metal compound.

5. The optical laminate as defined in claim 1, wherein the optical film is a protective layer made of a transparent resin material.

6. The optical laminate as defined in claim 5, wherein a hard coat layer is formed on the protective layer made of a transparent resin material.

7. The optical laminate as defined in claim 1, which further comprises a protective layer made of a transparent resin material.

8. The optical laminate as defined in claim 1, which comprises a retardation film.

9. The optical laminate as defined in claim 1, where the value of expressed by the formula Aa×(Is/Ia) is 0.55 or more.

10. The optical laminate as defined in claim 1, wherein the polarizing film has a thickness of 10 μm or less.

11. The optical laminate as defined in claim 1, wherein the polarizing film has a thickness of 7 μm or less.

12. The optical laminate as defined in claim 1, wherein the polarizing film has a thickness of 5 μm or less.

13. A display comprising the optical laminate as defined in claim 1.

14. An optical laminate comprising a polarizing film comprised of a polyvinyl alcohol-based resin having oriented iodine, and a sub-laminate, wherein:
    the sub-laminate comprises at least an optically transparent adhesive layer and an optical film, wherein the optical film is bonded to a first surface of the polarizing film through the optically transparent adhesive layer;
    the polarizing film exhibits a property that a value expressed by the following formula: Aa×(Is/Ia), is 0.53 or more, where:
        Aa represents an absorbance in an absorption axis direction of the polarizing film at a wavelength of 480 nm;
        Ia represents a value obtained by integrating, over an entire interval in a thickness direction of the polarizing film, a distribution of integrated intensities in the thickness direction of the polarizing film, wherein each of the integrated intensities is obtained by integrating a Raman spectrum of the polarizing film in a wavenumber interval of 90 cm$^{-1}$ to 120 cm$^{-1}$; and
        Is represents a value obtained by integrating, over the entire interval in the thickness direction of the polarizing film, a distribution of integrated intensities in the thickness direction of the polarizing film, wherein each of the integrated intensities is obtained by integrating, in a wavenumber interval of 90 cm$^{-1}$ to 120 cm$^{-1}$, Raman scattering of $I_3^-$ ions which exist in a region of the polarizing film ranging from the first surface to 1 μm inward in the thickness direction thereof, and oriented in the absorption axis direction of the polarizing film; and
    the sub-laminate has a thickness of 60 μm or more.

15. The optical laminate as defined in claim 14, wherein the sub-laminate has a thickness of 80 μm or more.

16. An optical laminate comprising a polarizing film comprised of a polyvinyl alcohol-based resin having oriented iodine, and a sub-laminate, wherein:
   the sub-laminate comprises at least an optically transparent adhesive layer and an optical film, wherein the optical film is bonded to a first surface of the polarizing film through the optically transparent adhesive layer;
   the polarizing film exhibits a property that a value expressed by the following formula: Aa×(Is/Ia), is 0.53 or more, where:
     Aa represents an absorbance in an absorption axis direction of the polarizing film at a wavelength of 480 nm;
     Ia represents a value obtained by integrating, over an entire interval in a thickness direction of the polarizing film, a distribution of integrated intensities in the thickness direction of the polarizing film, wherein each of the integrated intensities is obtained by integrating a Raman spectrum of the polarizing film in a wavenumber interval of 90 $cm^{-1}$ to 120 $cm^{-1}$; and
     Is represents a value obtained by integrating, over the entire interval in the thickness direction of the polarizing film, a distribution of integrated intensities in the thickness direction of the polarizing film, wherein each of the integrated intensities is obtained by integrating, in a wavenumber interval of 90 $cm^{-1}$ to 120 $cm^{-1}$, Raman scattering of $I_3^-$ ions which exist in a region of the polarizing film ranging from the first surface to 1 μm inward in the thickness direction thereof, and oriented in the absorption axis direction of the polarizing film; and
   the sub-laminate has a Haze value of 0.5% or more.

17. The optical laminate as defined in claim 16, wherein the sub-laminate has a Haze value of 1.5% or more.

18. The optical laminate as defined in claim 16, wherein the sub-laminate has a Haze value of 10% or more.

* * * * *